（12）United States Patent
Brenner et al.

(10) Patent No.: US 8,413,923 B2
(45) Date of Patent: Apr. 9, 2013

(54) METHOD OF AND DEVICE FOR ACTIVELY DAMPING VERTICAL OSCILLATIONS IN A HELICOPTER CARRYING A SUSPENDED EXTERNAL PAYLOAD

(75) Inventors: Hanno Brenner, Braunschweig (DE); Mario Hamers, Donauwoerth (DE)

(73) Assignee: Deutsches Zentrum für Luft- und Raumfahrt e.V., Köln (DE)

( * ) Notice: Subject to any disclaimer, the term of this patent is extended or adjusted under 35 U.S.C. 154(b) by 325 days.

(21) Appl. No.: 12/952,484

(22) Filed: Nov. 23, 2010

(65) Prior Publication Data

US 2011/0079678 A1 Apr. 7, 2011

Related U.S. Application Data

(63) Continuation of application No. PCT/EP2009/052886, filed on Mar. 11, 2009.

(51) Int. Cl.
*B64C 11/00* (2006.01)
*B64C 27/54* (2006.01)

(52) U.S. Cl. ............. 244/17.13; 244/17.11; 294/82.16

(58) Field of Classification Search ............ 244/137.1, 244/137.4, 136, 17.11, 17.13; 254/277, 275; 294/82.16; 212/272, 273, 274, 275
See application file for complete search history.

(56) References Cited

U.S. PATENT DOCUMENTS

| | | | | |
|---|---|---|---|---|
| 2,954,185 A | * | 9/1960 | Spratt | 244/3 |
| 3,554,468 A | * | 1/1971 | McVicar | 244/137.4 |
| 3,601,342 A | * | 8/1971 | Piasecki | 244/137.4 |
| 3,656,796 A | * | 4/1972 | Cook | 294/81.56 |
| 3,756,543 A | * | 9/1973 | Fowler et al. | 244/177 |
| 3,833,189 A | * | 9/1974 | Fowler et al. | 244/177 |
| 3,838,836 A | * | 10/1974 | Asseo et al. | 244/137.4 |
| 3,904,156 A | * | 9/1975 | Smith | 244/118.1 |

(Continued)

FOREIGN PATENT DOCUMENTS

| | | |
|---|---|---|
| DE | 690 15 572 T2 | 5/1995 |
| DE | 694 30 264 T2 | 11/2002 |

(Continued)

OTHER PUBLICATIONS

International Preliminary Report on Patentability of co-pending, related PCT Application No. PCT/EP2009/052886, dated Dec. 6, 2010.

*Primary Examiner* — Tien Dinh
*Assistant Examiner* — Michael A Fabula
(74) *Attorney, Agent, or Firm* — Thomas | Horstemeyer, LLP

(57) ABSTRACT

For damping vertical oscillations in a helicopter having a rotor drive-unit and an airframe and carrying an external payload suspended via a lifting gear from a load attachment point on the airframe, oscillation sensors are arranged on the helicopter, and an actively operated linear actuator is provided between the load attachment point and the lifting gear. With the oscillation sensors excitations of a first mode of the vertical oscillations, in which the external load and the rotor drive-unit oscillate together relative to the load attachment point, and of a second mode of the vertical oscillations, in which the load attachment point oscillates relative to the external load and the rotor drive-unit, are sensed, and forces opposed to the vertical oscillations are applied with the actuator between the load attachment point and the lifting gear as a function of the phase and of the amplitude of the sensed excitations.

12 Claims, 16 Drawing Sheets

U.S. PATENT DOCUMENTS

| | | | |
|---|---|---|---|
| 3,966,144 A * | 6/1976 | Gabriel | 244/17.11 |
| 4,267,987 A * | 5/1981 | McDonnell | 244/2 |
| 4,500,056 A * | 2/1985 | Della-Moretta | 244/137.4 |
| 4,502,652 A * | 3/1985 | Breitbach | 244/99.13 |
| 4,826,109 A * | 5/1989 | Camus | 244/137.4 |
| 5,344,203 A * | 9/1994 | Tollenaere | 294/68.1 |
| 5,435,531 A * | 7/1995 | Smith et al. | 267/140.11 |
| 5,499,785 A * | 3/1996 | Roberts et al. | 244/137.4 |
| 5,704,596 A * | 1/1998 | Smith et al. | 267/140.11 |
| 5,788,029 A * | 8/1998 | Smith et al. | 188/267 |
| 5,788,186 A * | 8/1998 | White | 244/137.4 |
| 5,853,144 A * | 12/1998 | Vincent | 244/17.13 |
| 6,067,853 A * | 5/2000 | Thevenot | 73/178 H |
| 6,279,704 B1 * | 8/2001 | Manfredotti | 188/378 |
| 6,533,220 B2 * | 3/2003 | Schuster | 244/118.1 |
| 7,370,829 B2 * | 5/2008 | Badre-Alam et al. | 244/17.13 |
| 7,954,766 B2 * | 6/2011 | Brainard et al. | 244/194 |
| 8,157,113 B2 * | 4/2012 | Golder | 212/284 |
| 8,190,307 B2 * | 5/2012 | Omar | 701/4 |
| 2007/0108340 A1 * | 5/2007 | Kulesha et al. | 244/17.11 |
| 2007/0200032 A1 * | 8/2007 | Eadie et al. | 244/137.4 |
| 2011/0079678 A1 * | 4/2011 | Brenner et al. | 244/17.13 |
| 2011/0192932 A1 * | 8/2011 | Brenner et al. | 244/17.13 |
| 2011/0303783 A1 * | 12/2011 | Brenner et al. | 244/17.13 |
| 2012/0292434 A1 * | 11/2012 | Welsh | 244/17.27 |

FOREIGN PATENT DOCUMENTS

| | | |
|---|---|---|
| EP | 0 425 352 B1 | 12/1994 |
| EP | 0 740 746 B1 | 3/2002 |
| GB | 2 415 418 A | 12/2005 |

* cited by examiner

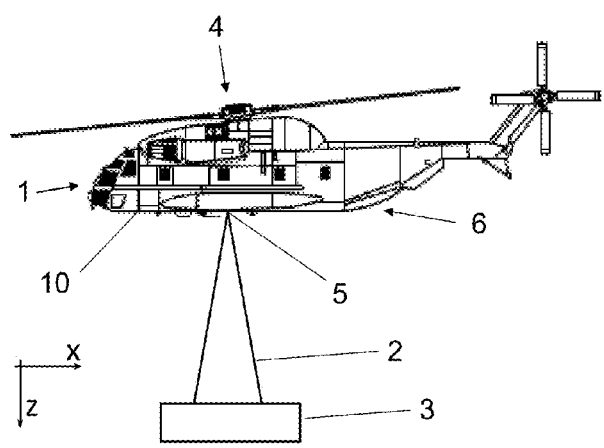
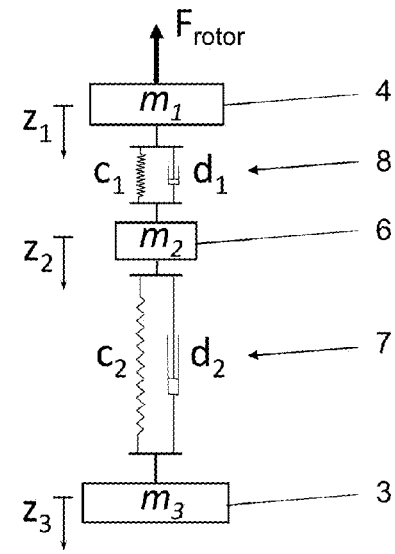
Fig. 1  Fig. 2
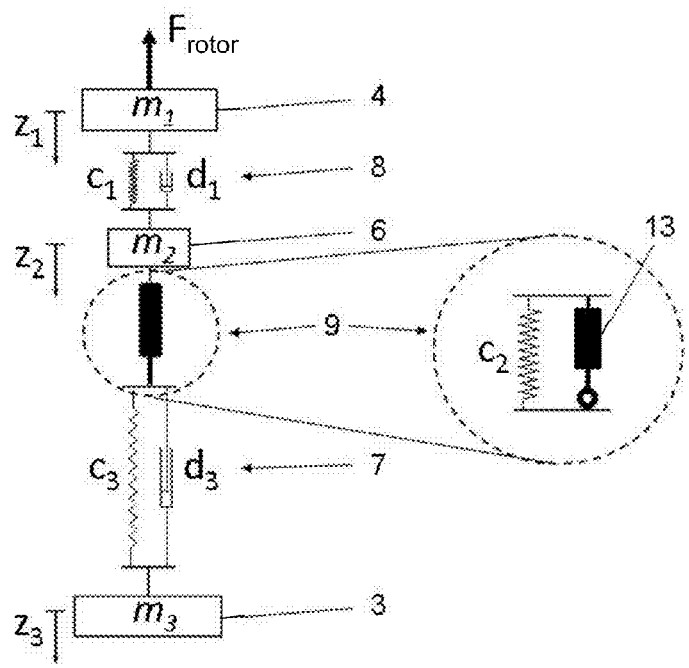
Fig. 3

METHOD OF AND DEVICE FOR ACTIVELY DAMPING VERTICAL OSCILLATIONS IN A HELICOPTER CARRYING A SUSPENDED EXTERNAL PAYLOAD

CROSS REFERENCE TO RELATED APPLICATIONS

The present application is a continuation of International Application PCT/EP2009/052886 entitled "Method and device for actively damping oscillations in a helicopter having an attached exterior payload", filed Mar. 11, 2009, and claims priority to co-pending German Patent Application No. DE 10 2008 025 298.0 entitled "Verfahren and Vorrichtung zur aktiven Dämpfung von Vertikalschwingungen bei einem Hubschrauber mit angehängter Außenlast", filed May 27, 2007.

FIELD OF THE INVENTION

The invention relates to a method of and a device for damping vertical oscillations in a helicopter carrying a suspended external payload.

Helicopters are often used to transport heavy loads as external payloads. These payloads are suspended below the helicopter by ropes or cables, for which the term lifting gear will be used in this description, and, depending on how they are suspended, may, like a pendulum, swing along the longitudinal and transverse axes, and may vibrate or oscillate along the heightwise (vertical) axis. As a rule, the transporting of external payloads by helicopter degrades the stability and flying characteristics of the overall system. This effect is particularly evident with heavy external payloads. Hence the transporting of heavy payloads has repeatedly resulted in incidents and accidents.

The present invention relates to the damping of vertical oscillations of the overall system formed by the helicopter, the lifting gear and the external payload. These vertical oscillations are a threat to the controllability of the helicopter and hence to its flying safety. Vertical oscillation modes arise due to the elasticity of the overall system formed by the helicopter and the external payload. In certain circumstances, these oscillation modes may not be very well damped and if resonance occurs they may rise to very high amplitudes. In the literature, this oscillatory phenomenon is referred to as vertical bounce. At the frequencies of the oscillations, which are comparatively high, the pilot is still tempted to make controlling reactions, but is no longer able to correct the oscillations in any useful way. In conjunction with the low system-related damping mentioned above, conditions are thus ideal for the occurrence of pilot assisted oscillations (PAO's).

Particularly in the case of the CH-53G transport helicopter, severe vertical oscillations have, in the past, led in a number of cases to situations in which control of the aircraft could only be recovered by dumping the payload. If the transport of external payloads is to be made safe and effective, methods and systems have to be found which improve the stability of the coupled system formed by the helicopter and the external payload and which will thus ensure that external payloads can be transported safely.

The vertical oscillations which are of interest to the invention differ strongly in frequency from pendular oscillations of the same external load, and, because of this, can be considered separately from these latter. The resonant frequency of the pendular oscillations is of the order of 1 [rad/s] whereas that of the vertical oscillations is a minimum of ~10 [rad/s]. In its main aspect, the present invention does not relate to the controllability and regulation of the pendular oscillations which occur in addition to the vertical oscillations.

BACKGROUND OF THE INVENTION

There are some studies in which the dynamics of a helicopter carrying an external payload are considered. However, the vast bulk of these studies are confined to simulating and analyzing the system without making any suggestions on how it can be stabilized. The first time any approaches can be found to solving the problem of vertical oscillations is in Gabel and Wilson (Test Approaches to External Sling Load Instabilities, 24th Annual National Forum, AHS-230, American Helicopter Society, 1968).

The problem of vertical oscillations affecting the CH-53G transport helicopter used by Germany's federal armed forces was studied by the German Federal Office of Defense Technology and Procurement back in the early 80's (see Buchacker, E., Flight Test Evaluation of the PIO-behaviour of a Helicopter with Suspended Cargo, AGARD, CP333, Paper 24, June 1982).

A simplified explanation of the mechanism by which this effect arises can be given on the basis of the mechanical equivalent model, consisting of three masses connected by springs and dampers, which is shown in FIG. 2.

What can be considered critical is a coincidence of the resonant frequency with one of the frequencies of structures which occur in the cockpit of the helicopter. By a feedback coupling of the oscillation through the pilot's body and arm to the collective control (a biomechanical coupling), it is possible that the system is excited in such a way that an unstable oscillation arises. An oscillatory phenomenon of this kind is referred to as pilot assisted oscillations (PAO's). The aim of currently proposed solutions to this problem is to find a way around this system-related resonance. In the literature, a distinction is made between the following approaches to a solution:

Prevention of Resonance:

What is meant by "prevention of resonance" is the deliberate selection of the lifting gear in the light of the resonant frequency of the vertical oscillation. The intention of this approach is to make the resonant frequency of the vertical oscillation lower than the frequency of any relevant excitation. To this end, it is essential that appropriate information exists on the lifting gear. It is also considered to deliberately provide the lifting gear with particular elastic properties.

Isolating/Damping Member:

In this approach, a further elastic element is inserted between the helicopter and the lifting gear which, because of the connection in series, ensures that the resonant frequency will not exceed a fixed maximum value and that it is thus always sufficiently far away from the frequency of any relevant excitation.

Modification of the Collective Control:

The transmission characteristics of the control are altered by making modifications to the control system of a helicopter carrying a suspended payload such that high-frequency inputs of low amplitude are suppressed at the output but normal control inputs which are of flight mechanical relevance are transmitted unaltered. A simple modification to achieve this result is to increase the friction at the collective control. However, the increase which is thereby obtained in the amount of lag at the control also involves a reduction in stability. Releasing the collective control if severe oscillations occur has a similar aim. However, this is merely a reaction to a problem which has already occurred and, what is more, is not something which can be safely done in every situation in flight.

Particularly when external payloads are transported with the German federal defense forces' CH-53G helicopter, the only ways in which attempts have so far been made to stop oscillations are by releasing the control or by increasing the friction at the collective control (with a friction brake). If a critical flight condition caused by coupling between a helicopter and its external load cannot be obviated by action of the pilot, the external load has to be dumped. As a result, the helicopter at once becomes controllable again. However, the application of this procedure calls for the pilot to be trained to a high level and to have had extensive experience in the field of flying with external loads.

The object of an arrangement for isolating/damping oscillations is to suppress the transmission of forces and oscillatory energy to the object which is to be isolated. There are known systems which effect damping or isolation either passively or adaptively.

Passive systems work entirely without any energy input or signal processing. The system components formed by spring and/or damper elements are merely able to store or dissipate energy. The only way of affecting the dynamic behavior of the system is by changing components. Passive systems also include systems where the points to which the system to be isolated is connected are the natural nodes of the oscillation of the exciting system. This method is used for example for the insulation of helicopter airframes against vibration. However, with systems of this kind it is possible to suppress very specific frequencies or narrow bands of frequencies, only. Hence they are only suitable for use if the excitation takes place repeatedly at the same defined frequency (e.g. if the working point or operating point is fixed), and if the excited system is not subject to any variations (different distributions of the mass etc.) in operation. There is also the danger that passive systems may not dissipate enough energy for the particular requirements.

In a particular known method of and a device for damping vertical oscillations in a helicopter carrying a suspended external payload a passive damper which is arranged between the load attachment point and the lifting gear in parallel to a load-carrying spring applies forces which are opposed to the vertical oscillations which act at that point.

In adaptive systems, the properties of the passive elements are altered by a controlling action—generally manual. The energy consumption is confined to that required for the adjustment of the properties of the elements. As compared to the exciting frequency, the frequency with which adaptive action is taken is very low and thus inflexible.

A continuous variation in the properties of the passive elements of the system by means of a control loop is characteristic of a semi-active system. There is no exchange of energy with the oscillating system. The energy consumption comprises merely that used for the adjustment and for signal processing.

What all the above-mentioned approaches have in common is that they do not reduce the susceptibility of the system to vertical oscillations but are intended simply to prevent critical excitations from occurring; thus, there is no increase in the damping of critical resonant oscillations, but a simple shift of the resonant frequency away from the frequency of the relevant excitations occurring. There is thus still a potential risk of resonant oscillations being excited. Further, these systems can only be designed to deal with a limited number of discrete excitation frequencies or a small range of excitation frequencies, and they call for a great deal of training in and experience of flying with external payloads.

However, a characteristic of the actual transportation of external payloads is a large number of variations in configuration (e.g. of the helicopter and the weights of the loads, of the lifting gear used, of the pilot's control strategy, etc.). These variations shift the resonant frequencies of the overall system, which are dependent above all on the distribution of the masses. Hence, systems for preventing resonance at discrete frequencies are not capable of general use with strongly varying mass distributions and elasticities.

Active damping systems which actively generate forces opposed to oscillations in order to suppress oscillations or vibrations in or of a structure are basically known. However, the known principles cannot readily be applied to the damping of vertical oscillations in a helicopter carrying a suspended external load. What is missing for this purpose is, in the first place, a fixed reference system. In flight, a helicopter is suspended from its rotor, i.e. a free-floating and damped generator of thrust, and not from any fixed point. Further, when the payloads transported frequently change and the lifting gear used changes likewise, it would be extremely costly and complicated to obtain information on how the external loads will oscillate.

The description of the prior art in published German patent application DE 10 2005 022 212 A1 mentions an active method of and an active device for damping vertical oscillations in a helicopter carrying a suspended external payload, in which an active damping member is connected in series with a cable by which a load is suspended from a helicopter to reduce oscillations in the direction of the distance between the helicopter and the suspended load. However, the difficulty of obtaining an input signal for this purpose is pointed out, and the invention which is described in this patent application is not an active damping system but a method of indicating the state of movement of the load suspended from the helicopter to cause the pilot of the helicopter to take damping actions intuitively.

European Patent EP 0 425 352 B1 also published as DE 690 15 572 T2 discloses a device for the active damping of oscillations and mentions the possibility of frequency selective analyzing the signals from oscillation sensors by looking at a fundamental frequency.

From European Patent EP 0 740 746 B1 also published as DE 694 30 264 T2 and corresponding to U.S. Pat. Nos. 5,435,531 and 5,704,596 it is known for a vibration measuring arrangement, which has six accelerometers for measuring vibrations in all six degrees of freedom, to be arranged in the passenger compartment of a helicopter to enable active damping of the vibrations for providing a vibration-free flight to the passengers in the helicopter.

A need remains for a method of and a device for damping vertical oscillations in a helicopter carrying a suspended external payload which, with a limited amount of equipment and a limited expenditure of energy, are capable of applying a high degree of damping to relevant vertical oscillations without being affected by the variations in configuration which occur when different payloads are being transported.

U.S. Pat. No. 3,904,156 discloses an external load stabilisation apparatus improving modal damping of pendular oscillations of an external payload.

SUMMARY OF THE INVENTION

In one aspect, the present invention provides a method of damping vertical oscillations in a helicopter having a rotor drive-unit and an airframe and which carries an external payload suspended via a lifting gear from a load attachment point on the airframe of the helicopter. This method comprises the steps of: arranging oscillation sensors on the helicopter; providing an actively operated linear actuator operative between the load attachment point and the lifting gear; sensing, with the oscillation sensors arranged on the helicopter, excitations of at least of a first and a second modes of the vertical oscillations with regard to both phase and amplitude of the excitations; and applying, between the load attachment point and the lifting gear with the actively operated linear actuator, forces opposed to the vertical oscillations as a function of the phase and of the amplitude of the sensed excitations.

In another aspect, the present invention provides a device for damping vertical oscillations in a helicopter having a rotor drive-unit and an airframe and which carries an external payload suspended via a lifting gear from a load attachment point on the airframe of the helicopter. This device comprises: oscillation sensors arranged on the helicopter and adapted to sense excitations of at least a first and a second modes of the vertical oscillations with regard to both phase and amplitude of the excitations; and an actively operated linear actuator operative between the load attachment point and the lifting gear, and operated to apply forces opposed to the vertical oscillations as a function of the phase and amplitude of the excitations sensed with the oscillation sensors.

In both aspects of the invention, the external load and the rotor drive-unit oscillate together relative to the load attachment point In said first mode of the vertical oscillations, and the load attachment point oscillates relative to the external load and the rotor drive-unit in said second mode of the vertical oscillations.

Other features and advantages of the present invention will become apparent to one with skill in the art upon examination of the following drawings and the detailed description. It is intended that all such additional features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

FIG. 1 shows a helicopter carrying a suspended external payload.

FIG. 2 shows an open equivalent system for the helicopter carrying a suspended external payload shown in FIG. 1.

FIG. 3 shows the equivalent system of FIG. 2 with an incorporated active damping system.

DESCRIPTION OF THE INVENTION

Figure 4:
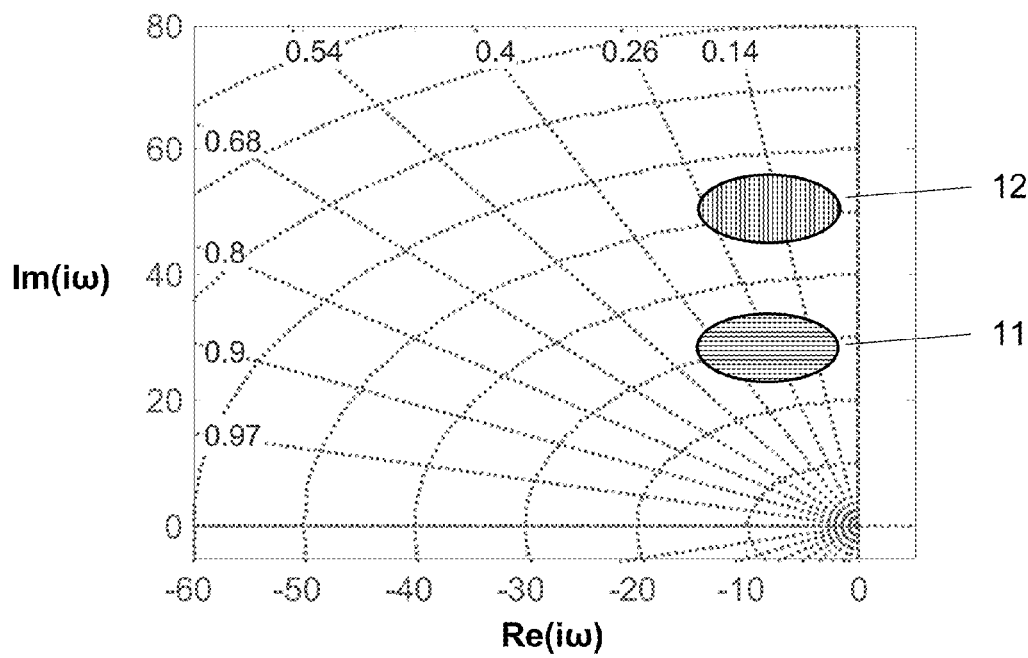
FIG. 4 shows ranges of eigenvalues for the open equivalent system shown in FIG. 2.

In the new method of damping vertical oscillations in a helicopter having a rotor drive-unit and an airframe and carrying an external payload suspended via a lifting gear from a load attachment point on the helicopter airframe, at least the excitations of a first mode of the vertical oscillations, in which first mode the external load and the rotor drive-unit oscillate together relative to the load attachment point, and of a second mode of the vertical oscillations, in which second mode the load attachment point oscillates relative to the external load and the rotor drive-unit, are sensed by oscillation sensors on the helicopter; and forces opposing the vertical oscillations are applied between the load attachment point and the lifting gear by an actively operated linear actuator as a function of the phase and amplitude of the excitations sensed.

Surprisingly, it proves to be enough for oscillation sensors to be arranged on the helicopter itself for the excitations of those modes of the vertical oscillations which are material to the safety of the helicopter to be sensed. Further, these vertical oscillations can be actively counteracted by a single linear actuator between the load attachment point on the helicopter and the lifting gear by operating the linear actuator to generate forces between the load attachment point and the lifting gear. As a result of focusing on the two significant modes of the vertical oscillations, the requirements for the linear actuator can be met by commercially available linear actuators, and there is also no problem in supplying the energy for the linear actuator from the power supply system which is already present on board of a helicopter.

Basically, the demand for energy of an active damping system is high in comparison with all passive and adaptive systems, because energy is fed to the system selectively as a result of the phase opposition in which the linear actuator is actuated. Because this infeed of energy is focused on the two significant modes of the vertical oscillations, the higher quality of isolation or damping which can be achieved with an active damping system than with a passive or adaptive system can be obtained without an excessive amount of energy to be spent.

The fact of the new method focusing on certain modes makes it decidedly flexible in dealing with varying configurations caused by different external loads and sets of lifting gear and also by differently fuelled and loaded states of the helicopter itself. These different configurations result in different resonant frequencies of the modes. The new method follows these shifts in frequency directly.

In the new method, what is taken into account as one relevant mode of the vertical oscillation is that mode in which the external payload and the rotor drive-unit oscillate together relative to the load attachment point. The resonant frequency of this mode typically lies within a range of from 10 to 30 rad/s, any figure given in the unit of rad/s being able to be converted into a figure in the unit of Hz by dividing it by $2\pi$.

In the at least one other significant mode which is taken into account in the new method, the load attachment point oscillates relative to the external load and the rotor drive-unit. The associated resonant frequency is typically in a range of between 30 and 60 rad/s.

Whereas shifts in the said resonant frequencies occurring due to different configurations of the external load, the lifting gear or the loaded state of the helicopter itself make it impossible for the vertical oscillations to be damped by passive provisions, these shifts do not cover a range which presents any problem for active damping. Even the frequency range which is covered by both the resonant frequencies together is still comparatively small for active damping, as a result of which only limited requirements are, advantageously, set for the working range of the linear actuator in the frequency domain.

To enable both modes of the above indicated vertical oscillations to be sensed, oscillation sensors may be arranged on the one hand at the rotor drive-unit and on the other hand at the load attachment point or at a floor of the airframe of the helicopter. A mounting point of the rotor drive-unit is found to be beneficial in this case because it is easily accessible but is nevertheless close to the rotor itself. What is particularly suitable for example is the rotor gearbox. By having excitations of the other mode sensed at the floor of the airframe of the helicopter, the load attachment point itself can be kept free of oscillation sensors. For the oscillation sensors too, it is advantageous that the resonant frequencies of interest vary over a limited range only. Their working range in the frequency domain can therefore also be limited to this range.

In particular, it is possible to only use a single oscillation sensor on the helicopter for sensing the excitations per each mode of the vertical oscillations. The new method can therefore be carried out with only two oscillation sensors on the helicopter.

In the new method, the linear actuator is arranged between the helicopter and the external load in a series connection with the lifting gear, which series connection is in itself unusual for an active damping system. In principle, a damper which is additionally connected in series reduces the overall damping of a system. Even active dampers are usually connected in parallel with support on both masses which are oscillating relative to one another. However, there is no sensible way of achieving this in case of a helicopter carrying a suspended external load. Because of its active operation, the linear actuator is nevertheless in a position to actively damp the vertical oscillations of interest. To the end of directly exerting damping forces between the load attachment point and the lifting gear by operating the vertical actuator, static forces between the load attachment point and the lifting gear may be supported on the helicopter by a supporting spring which is connected in parallel to the linear actuator. Even when there is a supporting spring of this kind, the linear actuator, or rather the combination of the linear actuator and the supporting spring, is still connected in series with the lifting gear.

The new arrangement for damping vertical oscillations in a helicopter carrying an external load has already been largely explained by the explanation of the new method. In addition to that, it should be pointed out that the oscillation sensors of the new arrangement preferably have accelerometers, and that the linear actuator may have an electric motor or a hydraulic drive, the type of drive which is preferred being one which can be powered from a power source which is present on board the helicopter. An electrical supply is almost always present. Then, an electric motor is preferred. It is a particular advantage of the present invention that the requirements to be met by an actively operated linear actuator equipped with an electric motor can be easily met by commercially available linear actuators. A design study which will be described in detail below resulted in a maximum dynamic deflection of +/− 30 mm, a maximum frequency of 10 Hz, a dynamic variation in the load of +/− 12 kN and a maximum power consumption of 15 kW. This set of requirements can easily be met both by commercially available linear actuators and, as far as supplying the necessary power is concerned, by the electrical system of appropriate large transport helicopters.

The main advantage which the present invention has over previous provisions for damping vertical oscillations of a helicopter carrying a suspended payload is that the relevant vertical oscillations can be prevented over the entire range of excitation even when there is a wide variation in the parameters relating to the mass of the helicopter and the load and to the stiffness of the lifting gear. In particular, the complete damping of the vertical oscillations has nothing to do with how much training and experience the pilot of the particular helicopter has had. Feedback and mutually provoked resonances between the helicopter and the pilot are always avoided.

Now referring in greater detail to the drawings, FIG. 1 shows a helicopter 1 from which an external payload 3 is suspended by means of a lifting gear 2. In flight, the helicopter 3 is suspended from its rotor drive-unit 4 as a free-floating, damped body. The lifting gear 2 is supported on the airframe 6 of the helicopter at a load supporting point 5 which is situated on or close to the floor 10 of the airframe 6 of the helicopter. Also supported thereon are fuel tanks of the helicopters 1 which are not separately depicted in the drawings.

FIG. 2 shows an open equivalent system for the helicopter 1 carrying a suspended external load 3 as shown in FIG. 1, which open equivalent system covers not only the masses $m_1$ of the rotor drive-unit 4, $m_2$ of the airframe 6 of the helicopter and $m_3$ of the external load 3 but also the stiffnesses and dampings $c_1$, $d_1$ and $c_3$, $d_3$ between the rotor drive-unit 4 and the airframe 6 of the helicopter, and the airframe 6 of the helicopter and the external load 3, respectively.

FIG. 3 shows the equivalent system from FIG. 2 with an additional active damping system 9, made up of a linear actuator 13 and a supporting spring $c_2$ connected in parallel thereto. The active damping system 9 is connected between the load supporting point 5 and the lifting gear 2 shown in FIG. 1 and thus acts between the mass $m_2$ and the mass $m_3$, in series with the stiffness $c_3$ and the damping $d_3$. The supporting spring $c_2$ carries the static load represented by the external load 3 between the load supporting point 5 and the lifting gear 2. The purpose of the linear actuator 13 is to apply, between the load supporting point 5 and the lifting gear 2, dynamic forces which actively counteract vertical oscillations of the helicopter 1 carrying the suspended external load 3. This is done under control of oscillation sensors which are arranged solely on the helicopter 1.

Design Study

In the following calculations, assumptions are made about the stiffness of the airframe of the helicopter and its degree of damping, and an estimate is made of the stiffness of the lifting cable. In addition, the masses in the equivalent model (see FIGS. 2 and 3) were determined. The resonant frequencies of the airframe of the helicopter were verified from a practical example (including amongst other a video recording of an oscillation of a tail boom of a helicopter).

controlling structure and the design of the controller will be explained and the specifications for an active damping member will be discussed. Robustness in handling parameter variations will be demonstrated. Finally, concrete requirements will be formulated for a potential actuator.

Exciting Mechanism:

The frequency spectrum of the excitation is made up in essence of the frequency of rotation of the rotor and the multiples of the blade frequency (frequency of rotation of the rotor times number of blades=a harmonic of the number of blades). However, there is a swift drop in its intensity as frequency rises. This is because the rotor acts as a frequency filter and transmits harmonic variations in the blade forces only at multiples of the blade frequency. These frequencies may produce a large number of frequencies of oscillation of structures. If one of these frequencies coincides with the resonant frequencies of the coupled system formed by the helicopter and the external load, this may result in severe resonances which may possibly be accentuated by bio-mechanical feedback via the pilot to the collective control (pilot assisted oscillations=PAOs).

TABLE 1

Parameters assumed for the equivalent system

| | | |
|---|---|---|
| MTOW | Maximum take-off weight | 19050 [kg] |
| OWE | Operating weight empty (without fuel) | 10650 [kg] |
| $\Omega$ | Frequency of rotation of the main rotor | 3.2 [Hz] |
| n | Number of blades | 6 [–] |
| $m_F$ | Mass of fuel | Max. 2000 [kg] |
| $m_1$ | Total mass of gearbox and turbines | 8/10 OWE [kg] |
| $m_2$ | Total mass of floor of airframe and tanks | 2/10 OWE [kg] |
| $m_3$ | Mass of external load | Max. 5500 [kg] (7255 kg when partly fuelled) |
| $D_1$ | Degree of damping of airframe of helicopter | 0.1 [–] |
| $\omega_1$ | Resonant frequencies of airframe of helicopter | (30, 60) [rad/s] |
| $c_1$ | Stiffness of airframe of helicopter | $c_1 = \omega_1^2 \cdot (m_1 + m_2)$ [N/m] |
| $c_2$ | Stiffness of the spring supporting the static external load | 250000 [N/m] |
| $c_3$ | Stiffness of the lifting geat | 900000 – 1900000 [N/m] |
| $D_3$ | Degree of damping of the lifting gear | 0.01 [–] |
| $\left(\dfrac{dZ}{d\dot{z}_1}\right)$ | Aerodynamic derivative of the vertical velocity of the helicopter in hovering flight | –4730 [kg/s] |
| $\left(\dfrac{dZ}{d\delta c}\right)$ | Aerodynamic derivative of the vertical control (collective control δc) of the helicopter in hovering flight | –12162 [kg m/s²cm] |

In the following illustrative calculation, the fundamental ability to operate an active damping system for helicopter payloads is demonstrated on the basis of a simplified and linearized system. The active system acts, between the helicopter and external load, at the load-carrying hook. The dynamics of the airframe, the rotor and the external load plus cable gear, and the bio-mechanical feedback from the pilot are reduced to a spring-and-damper system (see FIG. 1 and FIG. 3). The potential which active damping has will be demonstrated by examples.

Characteristic values are assumed for the lifting gear, and aerodynamic coefficients which define the helicopter (a CH-53G) are assumed for the helicopter. All the variables required for calculating the control process were taken from measured data or calculated from characteristic values.

In what follows, the exciting mechanism which results in resonant oscillations will first be explained. The uncontrolled overall system as shown in FIG. 1 will then be analyzed in the light of variations in parameters, to enable a clear idea to be obtained of the problem fields. In the section after that the Control inputs may likewise cause an excitation of the coupled system formed by the helicopter and the external load. There are a wide range of frequencies at which these excitations are possible. In this way, in the German federal defense forces, states of oscillation have occurred in flight as a result of abrupt control inputs by pilots (pilot induced oscillations=PIOs) due to which the external load has had to be dumped.

By the insertion of an active and controlled damping member between the system of the helicopter and the system of the external load, all the oscillations which are possible over the entire frequency range are decoupled from one another. Oscillations generated in the system of the helicopter are thus unable to make their way into the system of the external load, and oscillations of the external load do not have any adverse effect on the system of the helicopter. Feedback and any inter-generated resonances are prevented from occurring. Oscillations excited by the pilot (PTO's, PAO's) and oscillations due to aerodynamic forces and mass-generated forces are damped. The result is safe flight in all flying states.

Modelling and Analysis of the System when there is No Active Damping System (ADS)

For the system to be analyzed, mathematical models suited to the problems posed for the different variant types of loading are required. A variety of simulations of helicopters carrying external loads moving in all degrees of freedom already exist. However, such models are generally too complex for an examination of the vertical movement and would cause attention to be diverted away from the nub of the matter. For this reason, what will be considered here is a model which is reduced to the crucial aspects. For this purpose, some simplifying assumptions are made:

the degrees of freedom are confined to the vertical movement;

the aerodynamic properties of the external load and of the lifting gear for the external load are ignored;

a linear aerodynamic model is used for the helicopter.

The resonant frequencies of the airframe of the helicopter are approximately 30 and 60 [rad/s] (see Table 1) and thus increase the working range of the damping system. The additional spring-and-damper system between $m_1$ and $m_2$ (see FIG. 2 and FIG. 3) makes explicit allowance for the intrinsic dynamics of the airframe of the helicopter and is included in the overall design.

The restriction to the vertical movement means a reduction in the size of the system of equations and thus enables a clear analysis to be made. Because the models considered are linear, all the state variables and output variables should be thought of as departures from the trimmed state. The trimmed state is always hovering flight.

The external load is represented by a rigid body. The lifting gear is represented by a linear spring-and-damper combination (FIG. 2 and FIG. 3).

What are obtained for the system being considered here are four main eigenvalues and hence two modes of oscillation which have to be considered (see FIG. 4). The first mode (bottom domain in FIG. 4) is characteristic of joint oscillation of the masses $m_1$ and $m_3$ while $m_2$ remains at rest (see FIG. 2). The second mode (top domain) represents oscillations of the airframe floor or of the load-carrying hook ($m_2$) while $m_1$ and $m_3$ remain at rest. Both modes exist in forms which range from slightly damped to marginally stable.

For the response of the system to a harmonic excitation to be analyzed, the transfer functions or frequency responses of the system as a whole shown in FIG. 2 have to be determined. To this end, the amplitude courses of the high pass filtered command variable ($2\ddot{z}_1+\ddot{z}_2$) are of particular interest in the present case, because the best way of determining whether critical resonant conditions can be expected is from them. These amplitude courses will be used at a later point in the example illustrating simple feedback. The high pass filter compensates for the drifts which can be expected on the part of the measuring sensors.

Figure 5:
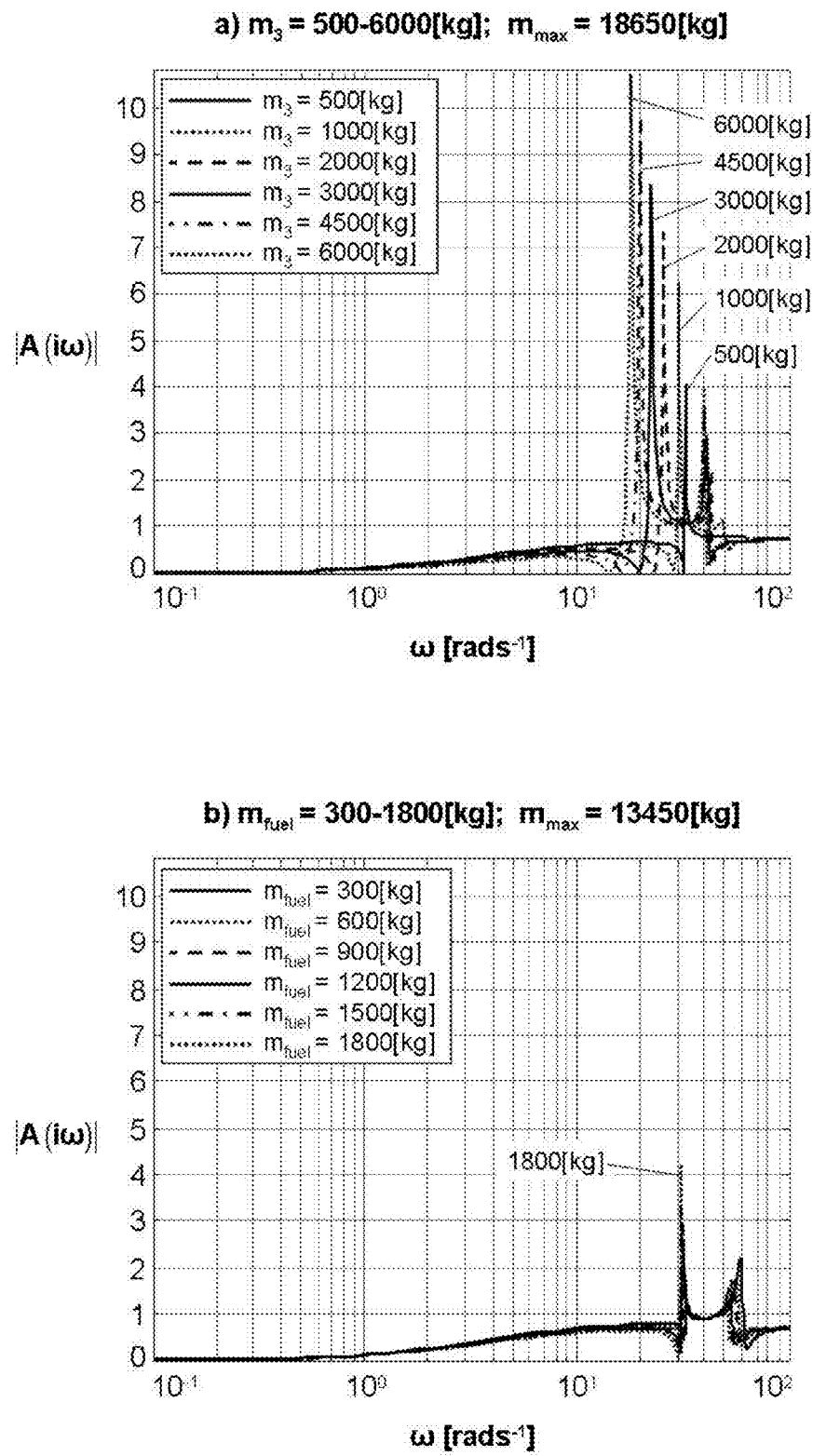
FIG. 5 shows course of the amplitude of a high pass filtered control variable $(2\ddot{z}_1+\ddot{z}_2)$ in the open equivalent system shown in FIG. 2.
Figure 5:
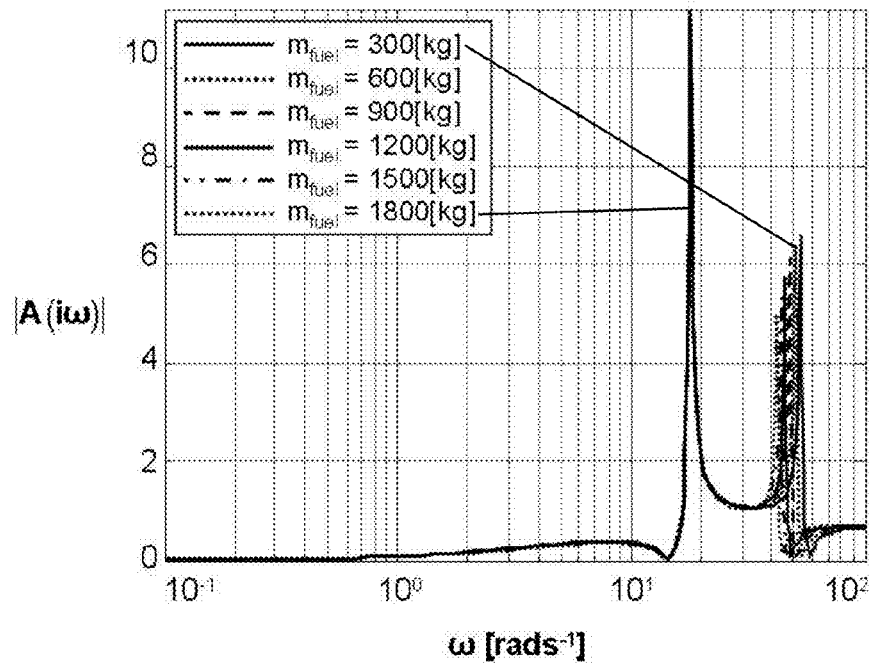
Figure 5:
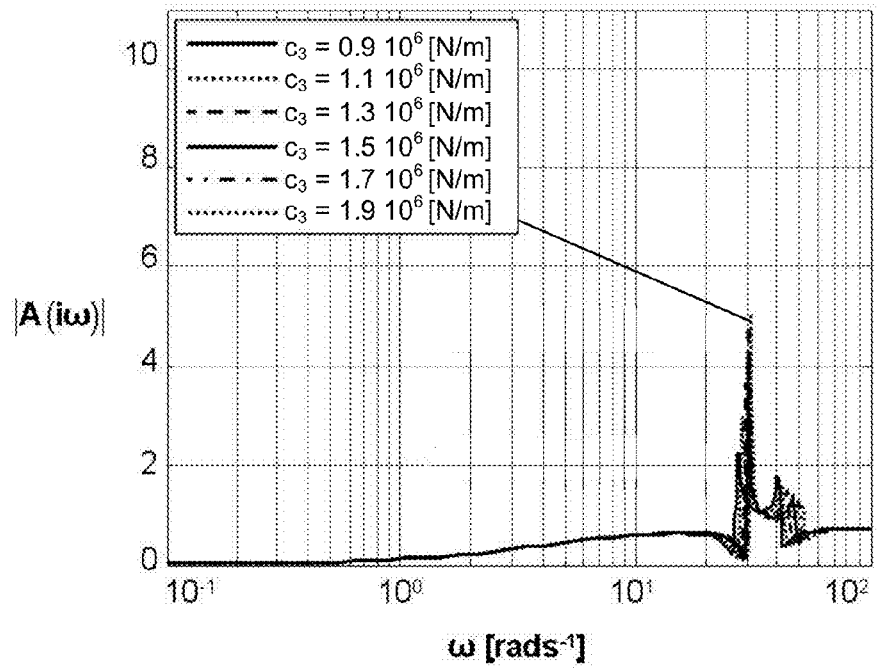
Figure 5:
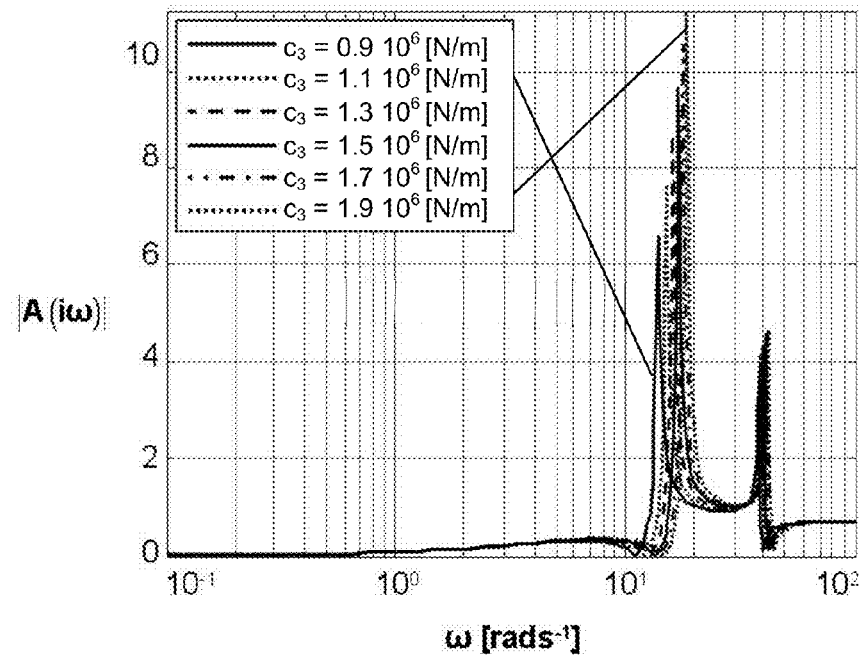
Figure 5:
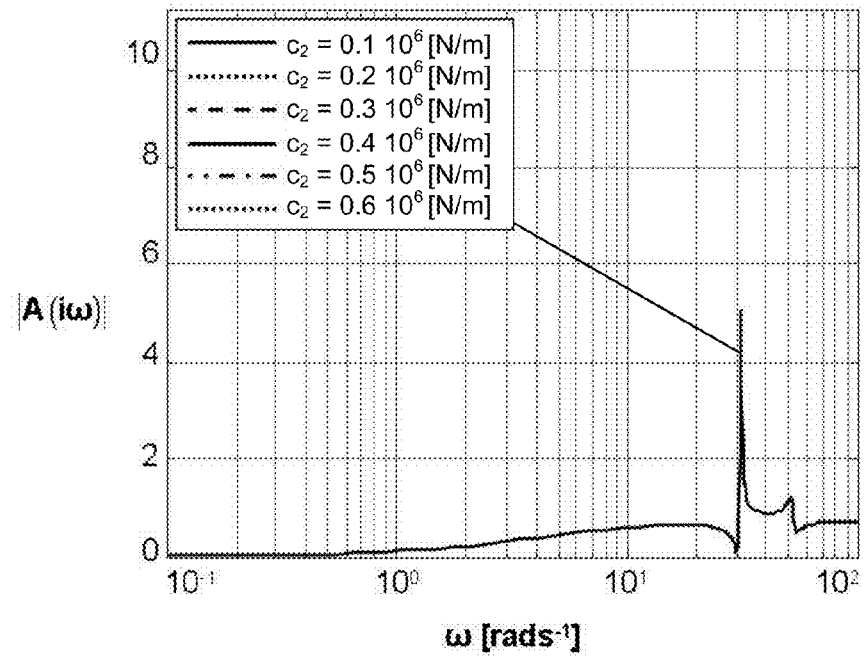

In the series of plots shown in FIG. 5, the amplitude responses to various variations in parameters are shown. Small amounts of damping of complex eigenvalues can be seen in the amplitude courses as high peaks. The smaller the weight of the external load, the closer to one another the two resonant frequencies represented by the modes are; this is plausible because without an external load ($m_3=0$) the helicopter only has one characteristic mode. The first mode, in the lower frequency range, represents the joint oscillation in the degrees of freedom $z_1$ and $z_3$ while $z_2$ remains at rest (see FIGS. 2 und 3). Variations in the first mode thus occur when there are heavy external loads which have effects on the degree of freedom $z_3$ (see FIG. 5$a$), and as a result of changes in the stiffness $c_3$ of the cable gear (see FIGS. 5$d$, 5$e$). In the second mode, in the upper frequency range, $z_1$ and $z_3$ remain at rest while $z_2$ creates a resonance. Changes in the mass $m_2$, e.g. due to changes in the amount of fuel $m_{fuel}$, thus affect the second mode (see FIGS. 5$b$, 5$c$). Changes in the stiffness $c_2$ of the supporting spring do not have any effect on the system (see FIG. 5$f$).

As the mass of the external load increases, a mode of resonant oscillation comes into being which becomes increasingly strong and whose frequency declines and in which there is coupling between the external load and the helicopter's gearbox deck ($m_3$ and $m_1$). In the case of large external loads, this frequency converges with frequencies close to those of the tail boom. The tail boom is fastened directly to the gearbox deck and oscillation may thus result in damage to the structure and consequently in total losses.

Figure 6:
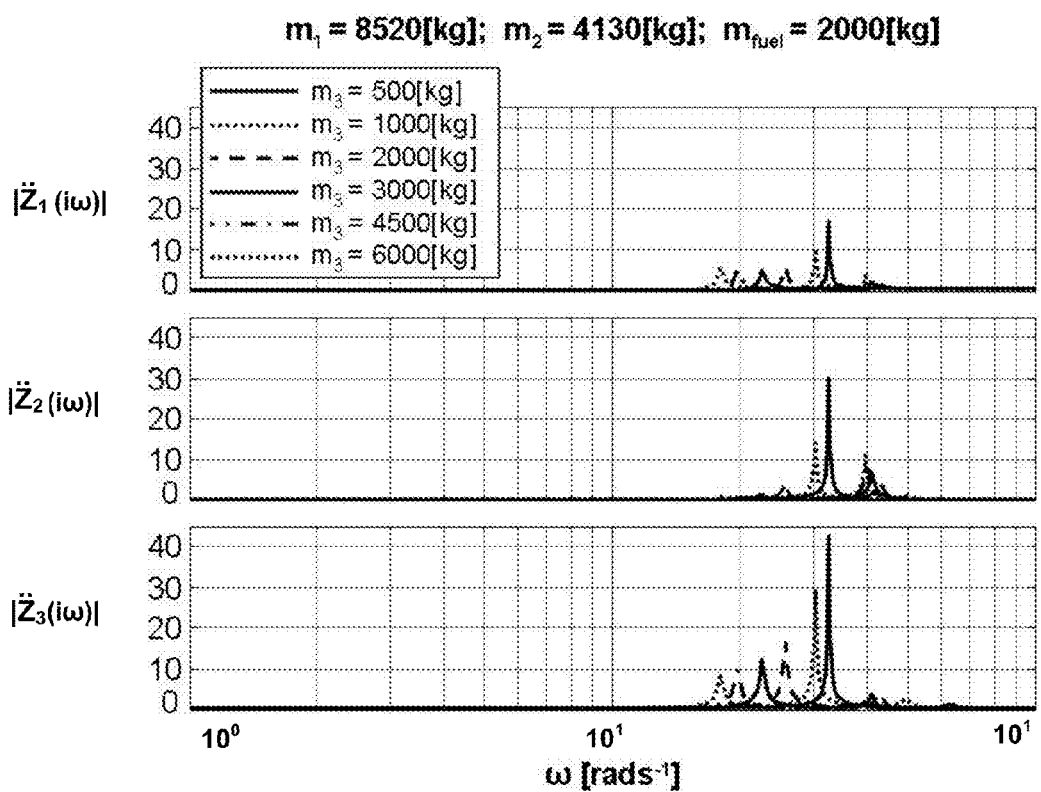
FIG. 6 shows, for a reference case, the amplitudes of the accelerations in the degrees of freedom z1, z2 and z3 of the open equivalent system shown in FIG. 2, over the spectrum of excitation at the collective control.

Shown in FIG. 6 for a reference case are the amplitudes of the accelerations in the degrees of freedom $z_1$, $z_2$ and $z_3$ over the spectrum of excitations at the collective control. In the bottom frequency domain (~20 rad/s), it can be seen that, with heavy external loads, measurable high peaks occur in $z_1$ and $z_3$, while $z_2$ remains at rest, as explained above. The highest peaks occur at the external load 3 ($z_3$) and at the load-carrying hook 5 ($z_2$).

To enable quantitative statements to be made about the frequency amplitudes which occur, a system is excited by what are referred to as frequency sweeps. The amplitude of the collective control is set in such a way that the levels of acceleration in $z_1$ and $z_2$ in the resonant condition do not exceed the limit given in MIL-H-8501A (Military specification criteria for control and response characteristics) of ~0.2 g, as it is also the case in the present actual example of the helicopter CH53.

According to the military upper limit for oscillations, a maximum control deflection of ±0.5 cm (±2%) was set for the maximum collective control.

Figure 7:
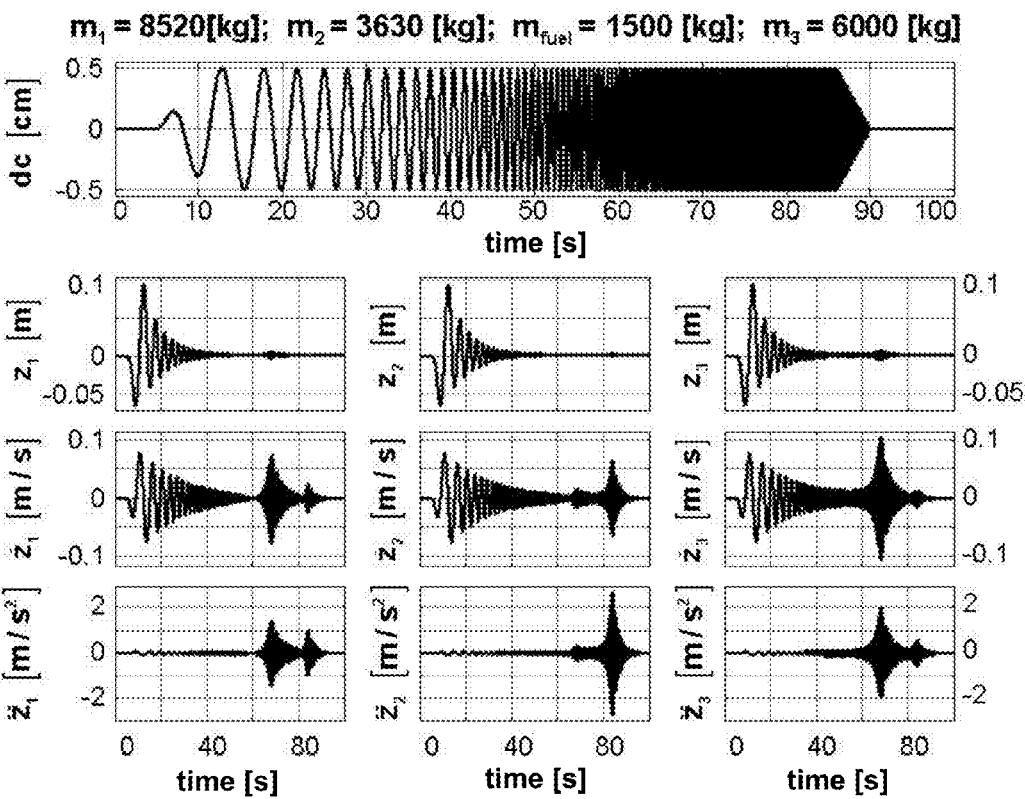
FIG. 7 shows, for the open equivalent system shown in FIG. 2, plots against time of the positions, velocities and accelerations resulting from a frequency sweep at the control, with a heavy external payload.

It can be seen from FIG. 7 that different amplitudes of oscillation were reached in the degrees of freedom $z_1$, $z_2$ and $z_3$ at different times and hence at different frequencies. As above, it is noticeable that $z_1$ and $z_3$ were subject to a common oscillation but in opposite directions. The maximum acceleration was found to be ~2.2 m/s² (~0.22 g) at time t=85 seconds in $z_2$. For light external loads 3 there was an increase in the acceleration in $z_3$ (see FIG. 8).

From the series of plots shown in FIGS. 5, 6, 7 and 8, it is clear that the relevant information on oscillations can be found in the accelerations in $z_1$, $z_2$ and $z_3$; the frequencies of the oscillations in $z_1$ and $z_3$ are very largely the same in them.

Figure 9:
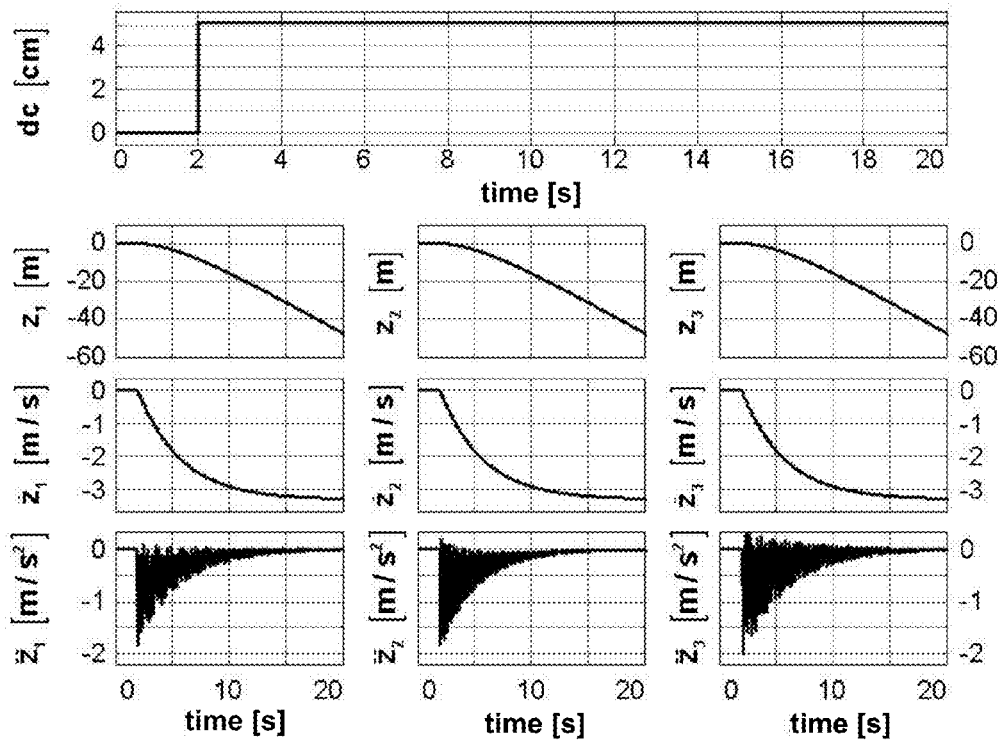
FIG. 9 shows step responses of positions, velocities and accelerations for the open equivalent system shown in FIG. 2, with a heavy external payload.
Figure 10:
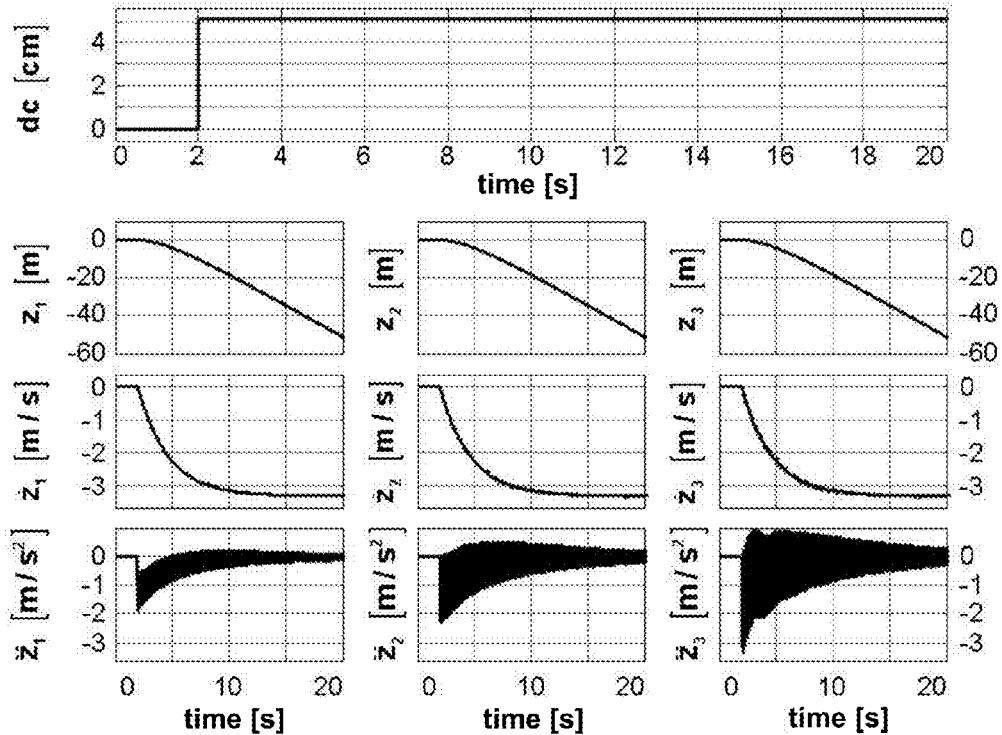
FIG. 10 shows step responses of positions, velocities and accelerations for the open equivalent system shown in FIG. 2, with a light external payload.

What is particularly characteristic of the properties of the system for the purposes of control is its response to step control inputs. The response of the system to a single step is shown by the series of plots in FIG. 9 for a heavy external load and by the series of plots in FIG. 10 for a light external load. The transient response with an external load is of very poor quality, as can be seen if the accelerations are considered. This is due to the small amount of damping of the mode of oscillation.

The aims of the active damping system can thus be formulated as follows:

an increase in the damping of both modes in the frequency range from 10 to 60 rad/s; and damping of the accelerations in $z_1$ and $z_2$ to a maximum of 0.2 g (1.962 m/s²).

By the analyses which were carried out on the uncontrolled (open loop) system, it was possible to show that there are two distinctive modes of oscillation of the system as a whole whose intensity and frequency are dependent to a significant degree on the weight of the external load ($m_3$) and the fuel ($m_2$) and on the stiffness of the cable gear ($c_3$). It was also possible to show that all the information on the two modes of oscillation could be called up from the degrees of freedom $z_1$ and $z_2$, meaning that oscillations of the external load in $z_3$ could also be detected by measuring the spectrum of $z_1$. The result of this is that, by measuring $z_1$ and $z_2$ alone, it is possible to determine a command variable for control purposes which gives information on the entire spectrum of frequencies which occur. Oscillations of the external load in $z_3$ can be ignored as information for use as a command variable. This gives the advantage from the operational point of view that no additional sensors have to be mounted on the load system (the external load and the cable gear); what is more, no signal or power supply lines have to be run out of the helicopter.

Design of Control System and Specifications for Actuator

In selecting the damping system, it must be borne in mind that for obvious reasons this does not act directly between the helicopter and the external load but is connected in series with the lifting gear. An additional damper connected in series reduces the overall (passive) damping. This is why neither passive nor adaptive nor semi-active systems can be used. Only an active system can increase the damping in a series connection of this kind. The incorporation of the active damping system in the existing system formed by the helicopter and external load is shown in FIG. 3. Because of the unconventional position in which the oscillation damping system is installed (connected in series), recourse cannot be had to proven control algorithms which are known for systems connected in parallel, e.g. from automobile running gear engineering.

To match the requirements to be met by the control actuator to the specifications of commercially available actuators, an additional support for the weight of the external load was incorporated in the form of a stiff spring (see FIG. 3, stiffness $c_2$ of the spring). This reduces the power consumption of the actuator.

Figure 11:
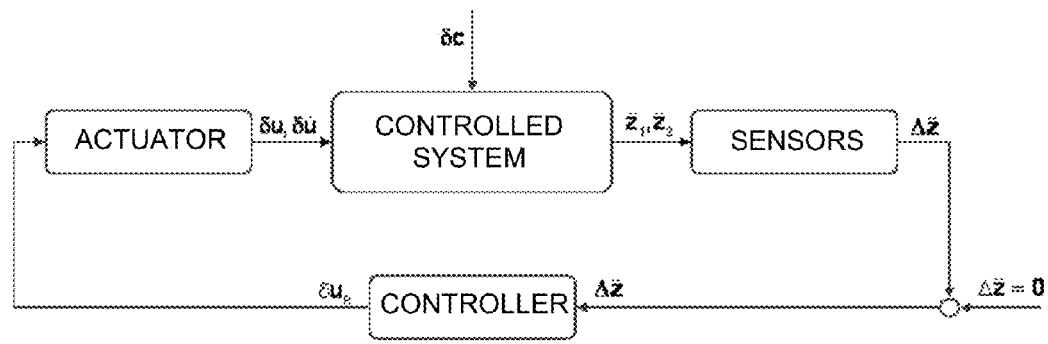
FIG. 11 shows the structure of a feedback control circuit for the active damping system shown in FIG. 3.

The structure of the control circuit is shown in FIG. 11. The formal command variable of the control is the relative acceleration between the helicopter gearbox or the rotor unit 4 ($z_1$), and the floor 10 of the airframe 6 of the helicopter or the load-carrying hook 5 of the helicopter ($z_2$). The desired value of the command variable is zero because relative movements (oscillations) of the two levels $z_1$ and $z_2$ of the airframe are to be suppressed. The above analyses made of the open-loop system showed that all the information on the two modes of oscillation can be called up in the signals for $z_1$ and $z_2$ and that information can thus also be called up on the oscillations of the external load 3 in $z_3$.

The accelerations of the airframe 6 of the helicopter at levels $z_1$ and $z_2$ are sensed by means of accelerometers. A controller having the control circuit shown in FIG. 11 generates a controlling variable $\delta u_R$ which is used for operating the actuator; the latter then applies the actual correcting variable, namely the actuator travel $\delta u$ and the velocity $\delta \dot{u}$ of the actuator travel.

The relative acceleration between the helicopter and the external load is obtained by summing up the two acceleration signals. It has also been found that the result of the control operation can be improved if the signal at $z_1$ is amplified by a factor of 2:

$$\Delta \ddot{z} = (2\ddot{z}_1 + \ddot{z}_2) \quad (1)$$

The measurement signal is then high pass filtered so that the only frequencies are taken into account which are above the range which is effective from the point of view of flight mechanics and so that drift on the part of the sensors is compensated for.

$$F_F(s) = \frac{Ts}{Ts+1} \quad (2)$$

The cut-off frequency of the filter must be selected in such a way that only frequencies in the ranges which the pilot is able to control are suppressed. As a rule, a human being is no longer capable of taking any useful controlling action as from a frequency of about one Hertz (~6 rad/s). The following was selected as the cut-off frequency:

$$\omega_{Cut-off} = \frac{1}{T} = 6 \text{ rad/s}. \quad (3)$$

As will be shown at a later point, the requirements to be met by the drive of the actuator with regard to forces to be applied, velocities of movement and positioning performance combined with actuator travels of a few millimetres are of an order such that they can be met for the helicopter considered here by electrical actuator drives.

Transmission by actuators of this kind constitutes a second order delay which is defined by the transfer function $$F_{SG}(s) = \frac{K}{\frac{1}{\omega_0^2}s^2 + \frac{2D}{\omega_0}s + 1}. \quad (4)$$

For the actuator to be able to fulfil its function, its resonant frequency must be sufficiently far away from the resonant frequencies of the control system. In case of the CH-53G helicopter which is considered here, the highest frequency which occurs in the vertical movement is ~50 rad/sec (see FIG. 5). A cut-off frequency of 60 rad/s and a degree of damping of D=0.7 are considered adequate for the type of helicopter considered here and, viewed against the background of the technical specifications, are considered as plausible:

$\omega_0$=60 rad/s $$D=0.7 \quad (5)$$

The constant K is a conversion factor. It is only not equal to one if the output of the controller is not identical to the actuator travel given by the drive. However, because this identity does apply in the present case, it is true that $$K=1 \quad (6)$$

The design of the controller in the open loop having sensors and an actuator gives an optimum result corresponding to the parameters which were preset:

$$F_R(s) = 0.045 \cdot \frac{0.017s+1}{0.67s+1} \quad (7)$$

The requirements to be met by the control system are laid down in the form of the damping which can be achieved:
- the behavior of the system must be stable (a negative real part);
- poles very close to the imaginary axis result in excessively slow behavior;
- poles too far away from the real axis result in a excessively aggressive actuating behavior and in excessively low robustness to deal with errors in the model;

poles whose imaginary part is too large in relation to their real part result in poorly damped behavior and thus in severe overshoots and oscillations.

Figure 12:
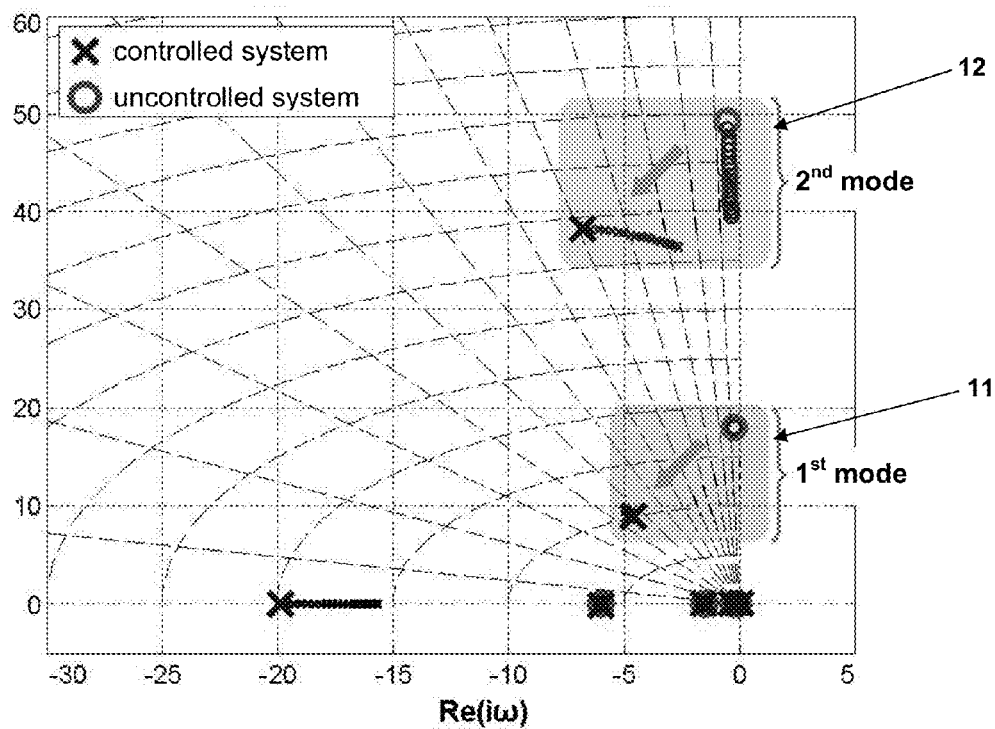
FIG. 12 shows the polar distribution for a variation in $m_{Fuel}$ of 300-2000 [kg], with and without an active damping system.
Figure 13:
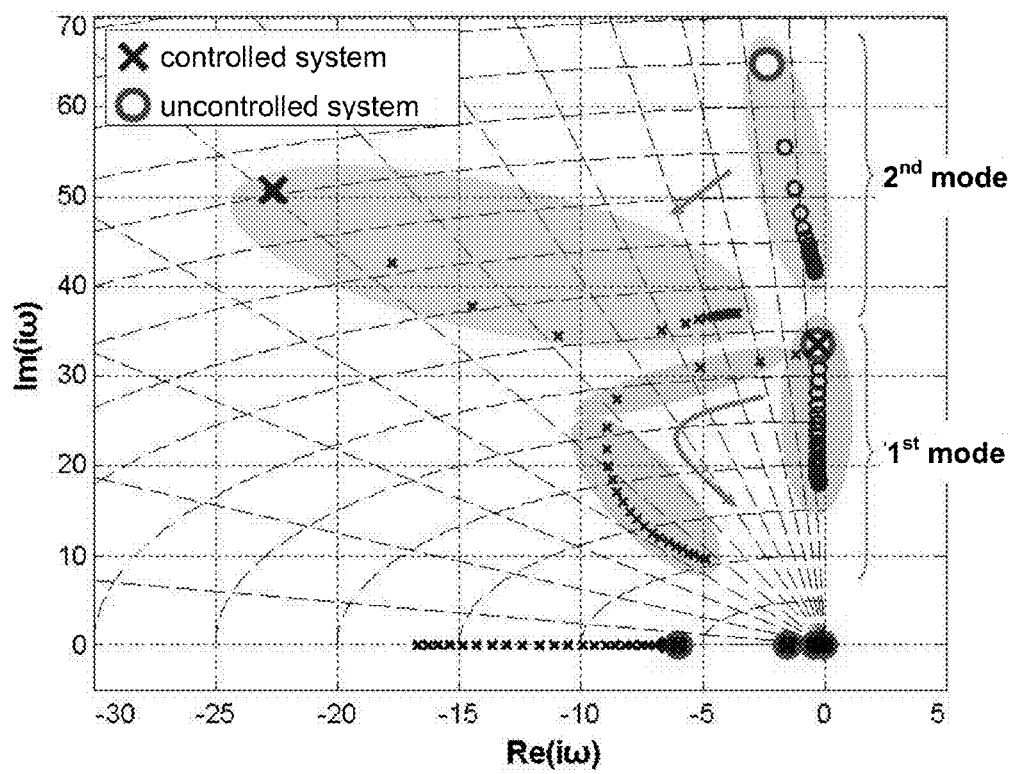
FIG. 13 shows the polar distribution for a variation in $m_3$ of 500-6000 [kg], with and without an active damping system
Figure 14:
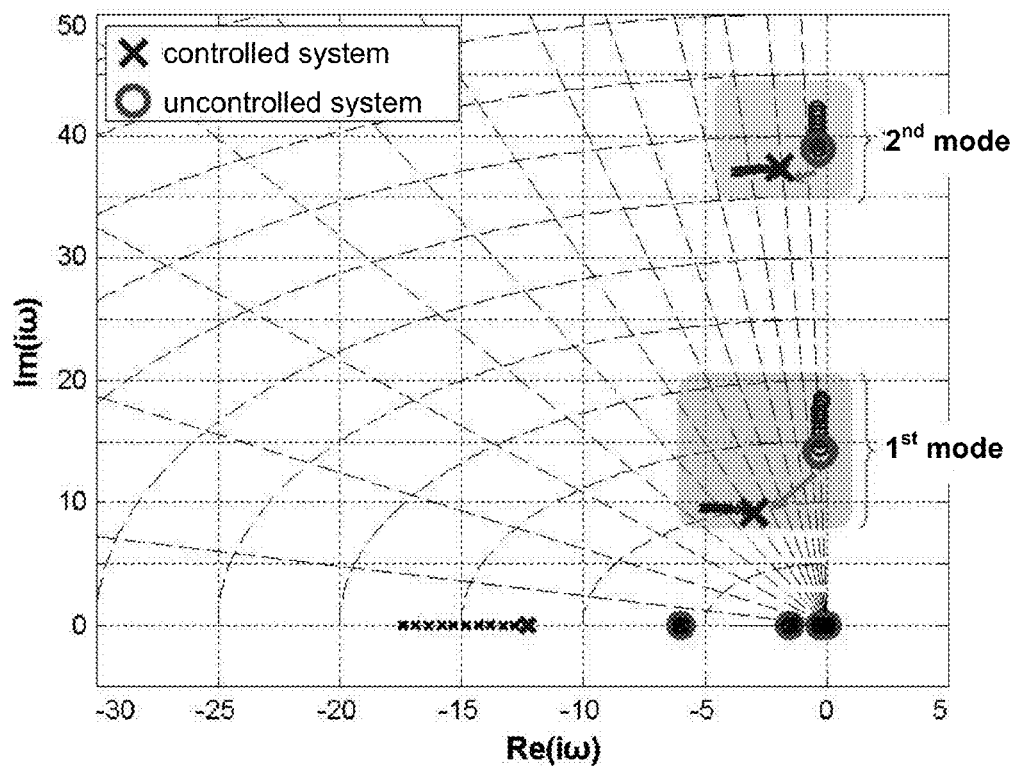
FIG. 14 shows the polar distribution for a variation in $c_3$ of 0.9-1.9 106 [N/m], with and without an active damping system.

Shown in FIGS. 12, 13 and 14 are the polar distributions for the controlled equivalent system shown in FIG. 3 (identified by X) and for the uncontrolled equivalent system shown in FIG. 2 (identified by O). The identifying markings, which differ in size, each indicate that pole which is associated with the lowest level of variation. The two modes 11, 12 of the vertical oscillation can be seen. The first mode is determined by the joint oscillation of $m_1$ (at level $z_1$) and $m_3$ (at level $z_1$). The second mode is determined by the oscillation of the floor 10 of the airframe ($m_2$) or rather of the load-carrying hook 5 ($m_2$, level $z_2$).

In FIG. 12, the polar distribution is plotted against the variation in the mass $m_2$ (amount of fuel). Since the fuel tanks are situated at level $z_2$, the main effect of the variation in $m_2$ is on the second mode. It can be seen that the damping of both modes increases when the active damping system (identified by X) is connected in. As the amount of fuel increases, the second mode becomes destabilized but is still adequately damped (stable).

The polar distributions of the controlled and uncontrolled system when subject to a variation in the weight of the load are shown in FIG. 13. There are significant effects on both modes. With loads of low weights, the pole representing the first mode is not significantly damped despite the active damping (the large X overlaps the large O). The reason for this is that in the range from 500 to 1250 kg (the first 4 variations) the external load has only a slight effect on the oscillations of the helicopter. Oscillations caused by a light external load are not present as information in the command variable. It is true that there is thus no opportunity for the active damping to increase the damping of the poles representing light external loads but on the other hand the effect of light external loads is negligible and there is thus no need for such modes to be damped. However, tests have shown that even the first mode can be damped by adjusting the command variable.

Being a movement of the floor of the airframe, the second mode is also damped by the use of the control system. As the weight of the load increases the damping of the second mode declines but is still adequately stable.

The polar distributions of the controlled and uncontrolled system when subject to a variation in the stiffness $c_3$ of the cable gear are shown in FIG. 14. Both modes are stabilized by the use of the active damping system. The damping of the poles continues to increase with increasing stiffness. What are used as a rule are sets of cable or lifting gear of high stiffness.

Figure 15:
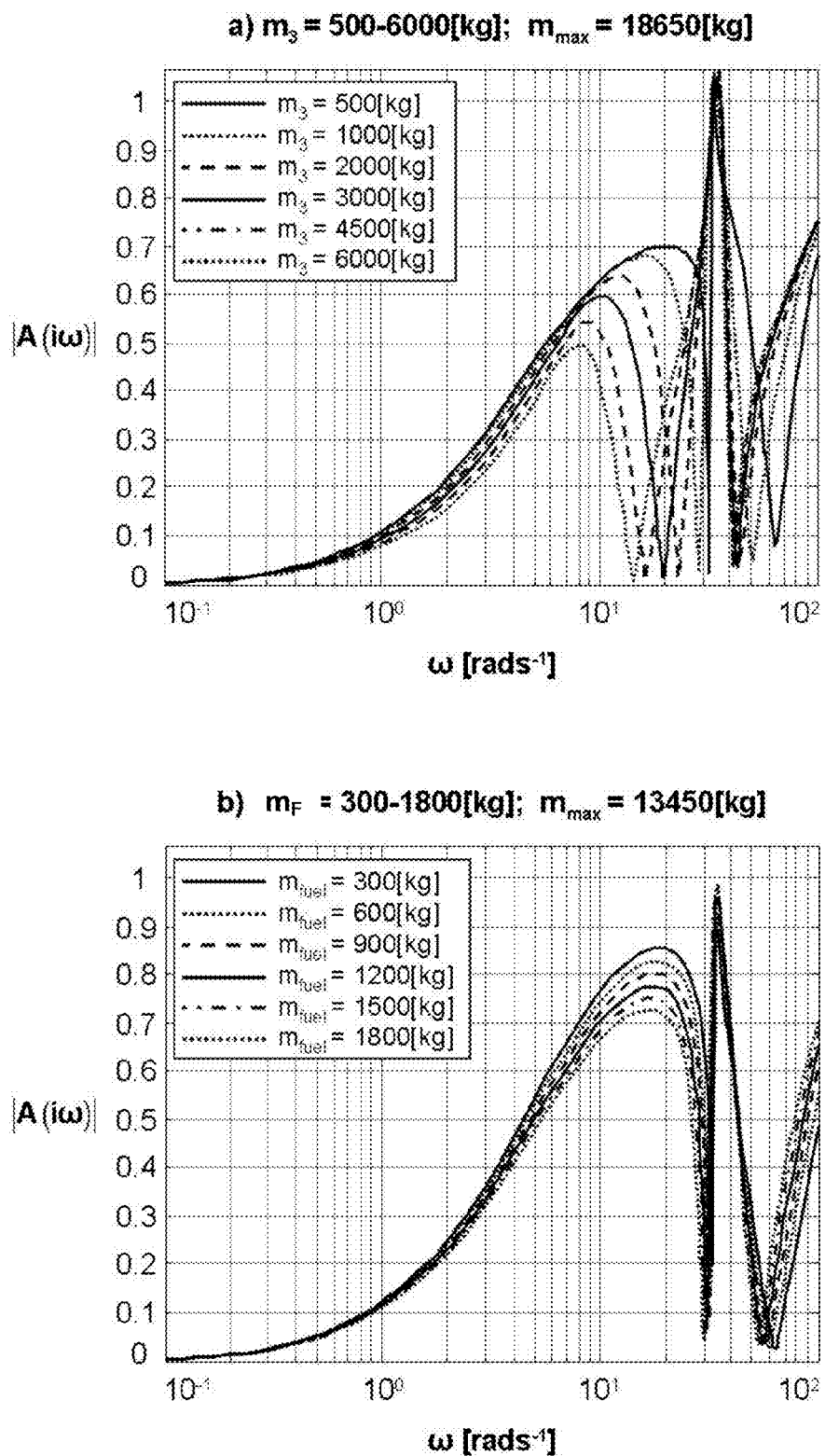
FIG. 15 shows amplitude responses of a high-pass filtered command variable $(2\ddot{z}_1+\ddot{z}_2)$ for the closed equivalent system shown in FIG. 3.
Figure 15:
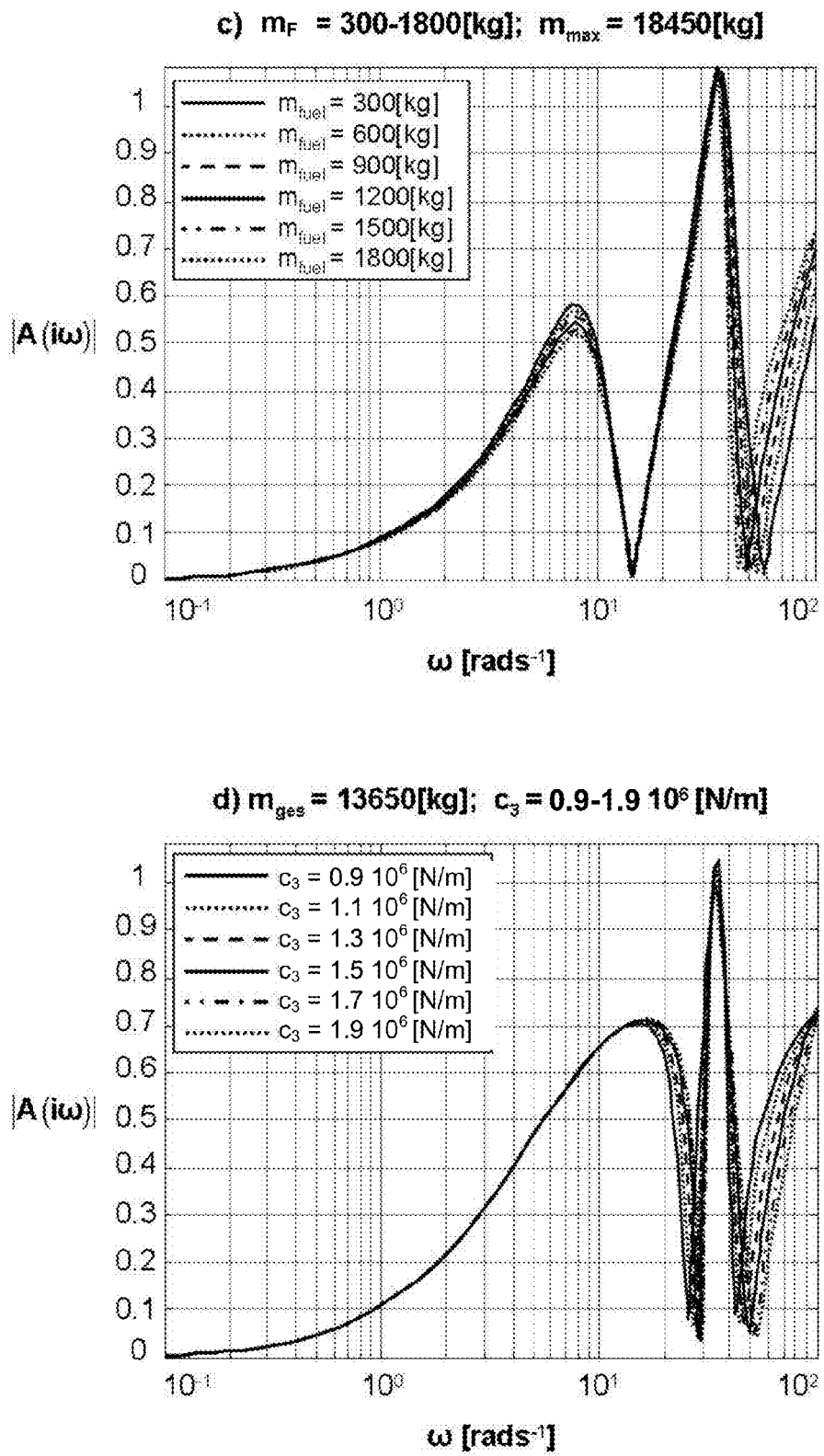
Figure 15:
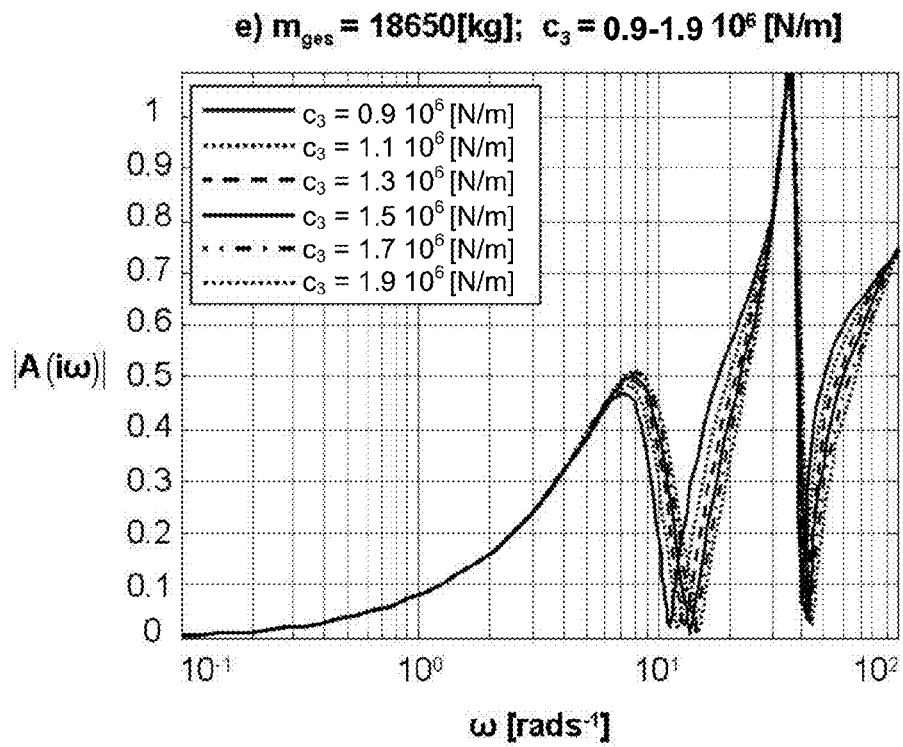
Figure 15:
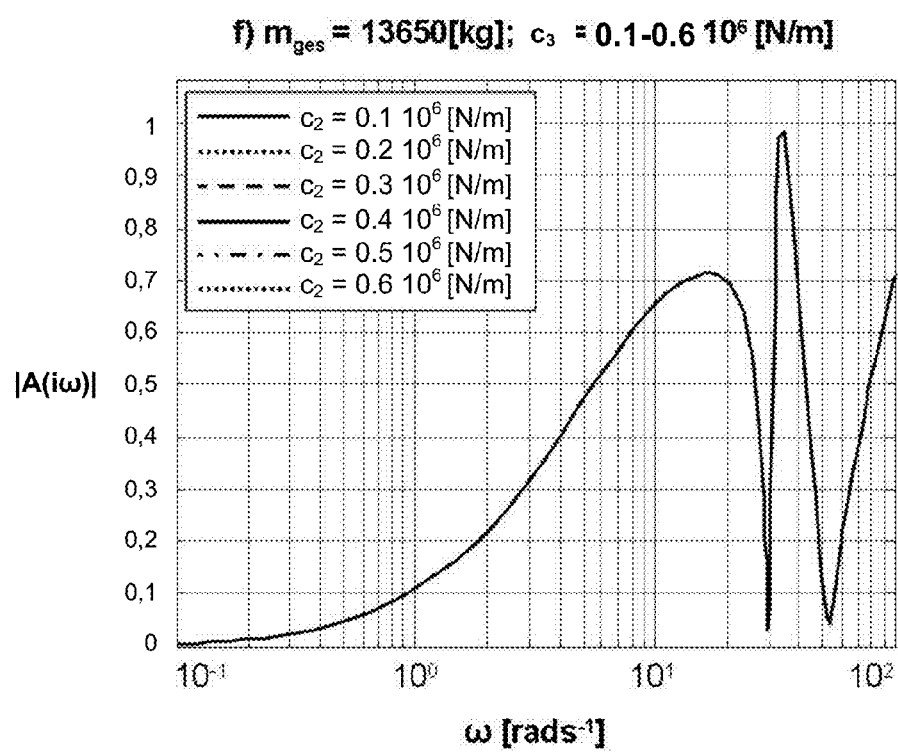

To supplement the foregoing explanations, it can clearly be seen from the series of plots in FIG. 15 for the controlled system that the amplitudes of the command variable go down on average by a factor of ten in comparison with the uncontrolled system (see FIG. 5). It has thus be shown that effective damping which is valid for relevant variations in parameters is achieved by the use of the controlled active actuator.

Figure 16:
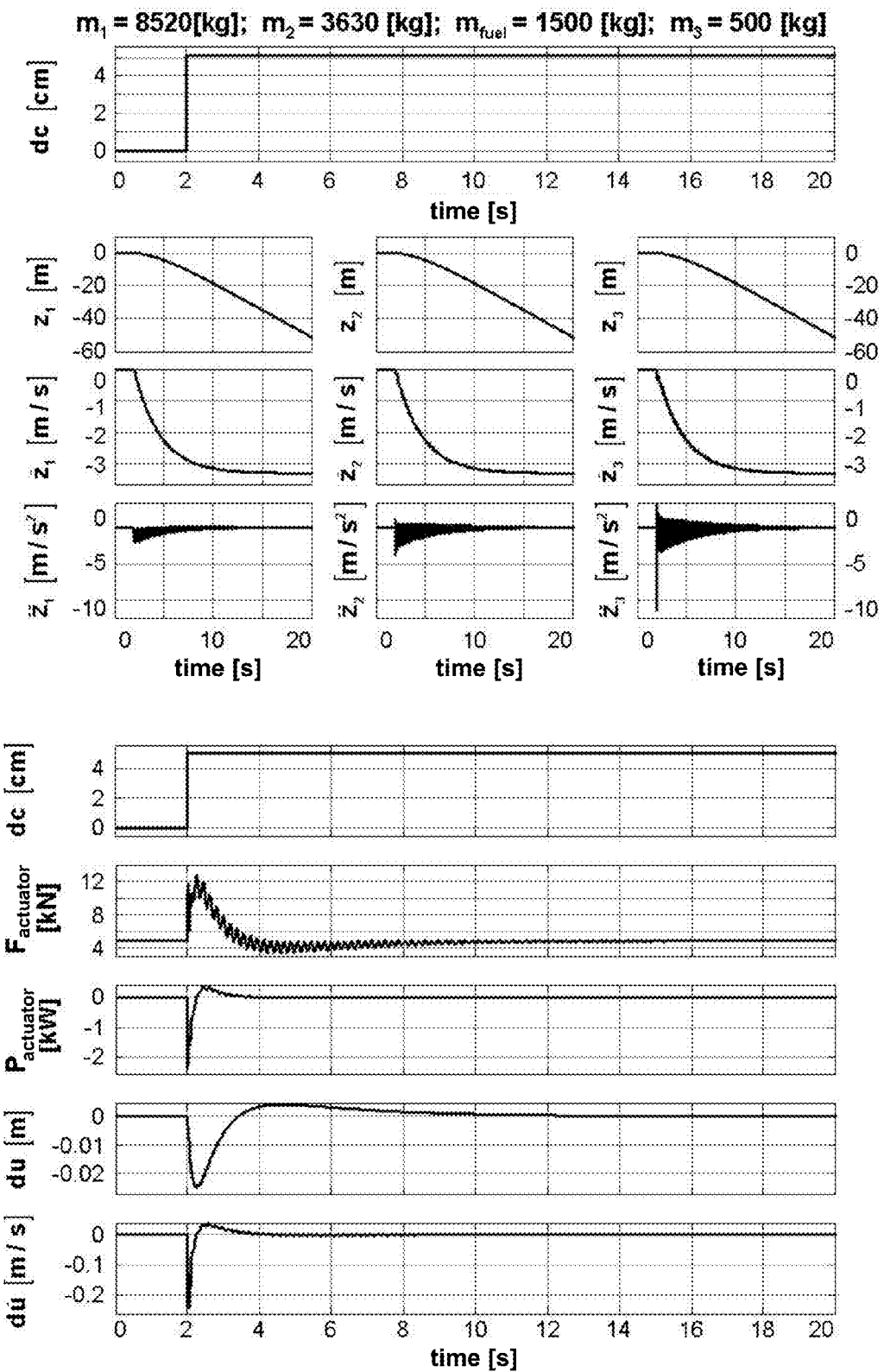
FIG. 16 shows step responses of positions, velocities and accelerations for the closed equivalent system shown in FIG. 3 with a light external payload.

The step responses of the movements on the three levels for a light external payload are shown in FIG. 16 and indicate that resonance of the system is stopped by the use of the controller despite the reduced effectiveness of the latter with light loads (see FIG. 13). The static weight of the payload is held and carried by the spring $c_2$ (see FIG. 3). The maximum dynamic force from the linear actuator 13 in response to a step input of 20[%] (5[cm]) is 7000[N] (power ~2200[W]) and the maximum actuator travel is 0.025[m].

Figure 17:
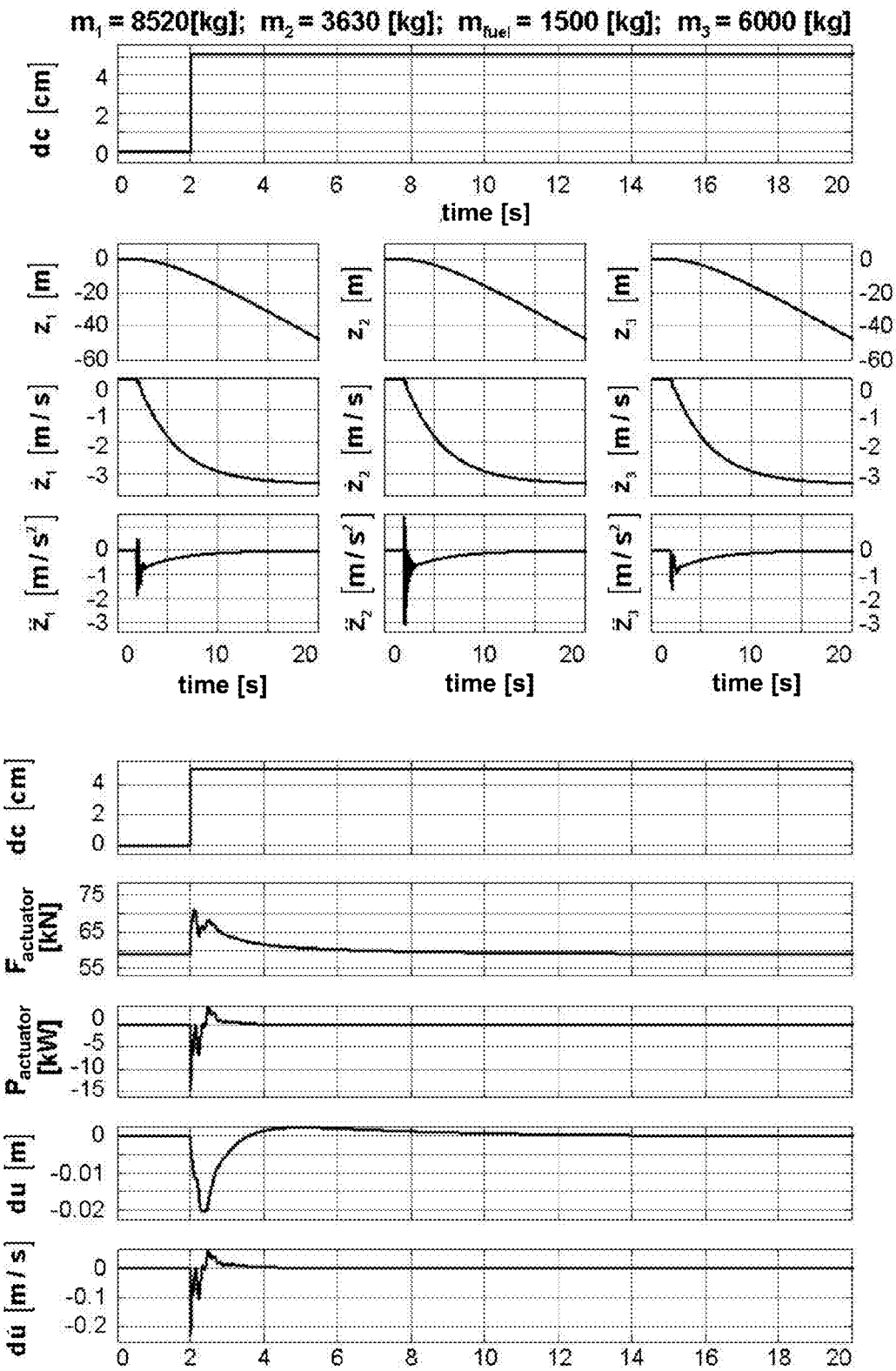
FIG. 17 shows step responses of positions, velocities and accelerations for the closed equivalent system shown FIG. 3, with a heavy external payload.

The step responses of the system (see FIG. 17) can be effectively damped when there is a heavy external load. The static weight of the load is held and carried by the spring $c_2$ (see FIG. 3). The maximum dynamic force from the actuator 13 in response to a step input of 20[%] (5[cm]) is 13000[N] (power of 15000[W]) and the maximum actuator travel is 0.022[m].

Figure 8:
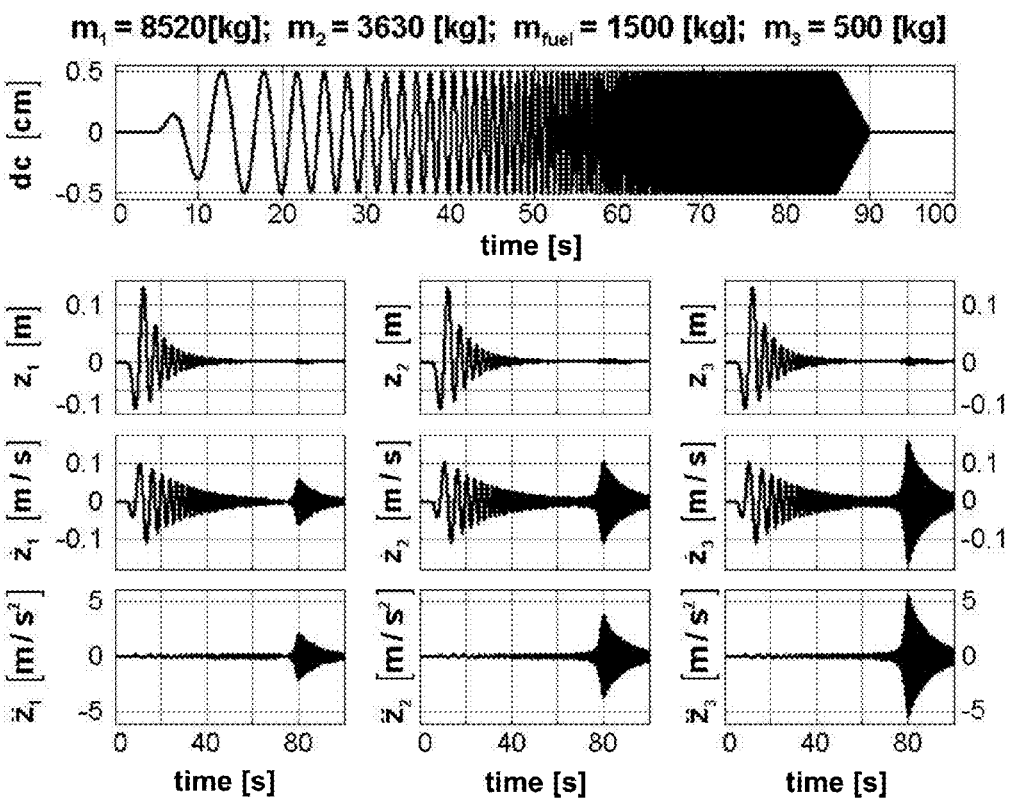
FIG. 8 shows, for the open equivalent system shown in FIG. 2, plots against time of the positions, velocities and accelerations resulting from a frequency sweep at the control, with a light external payload.
Figure 18:
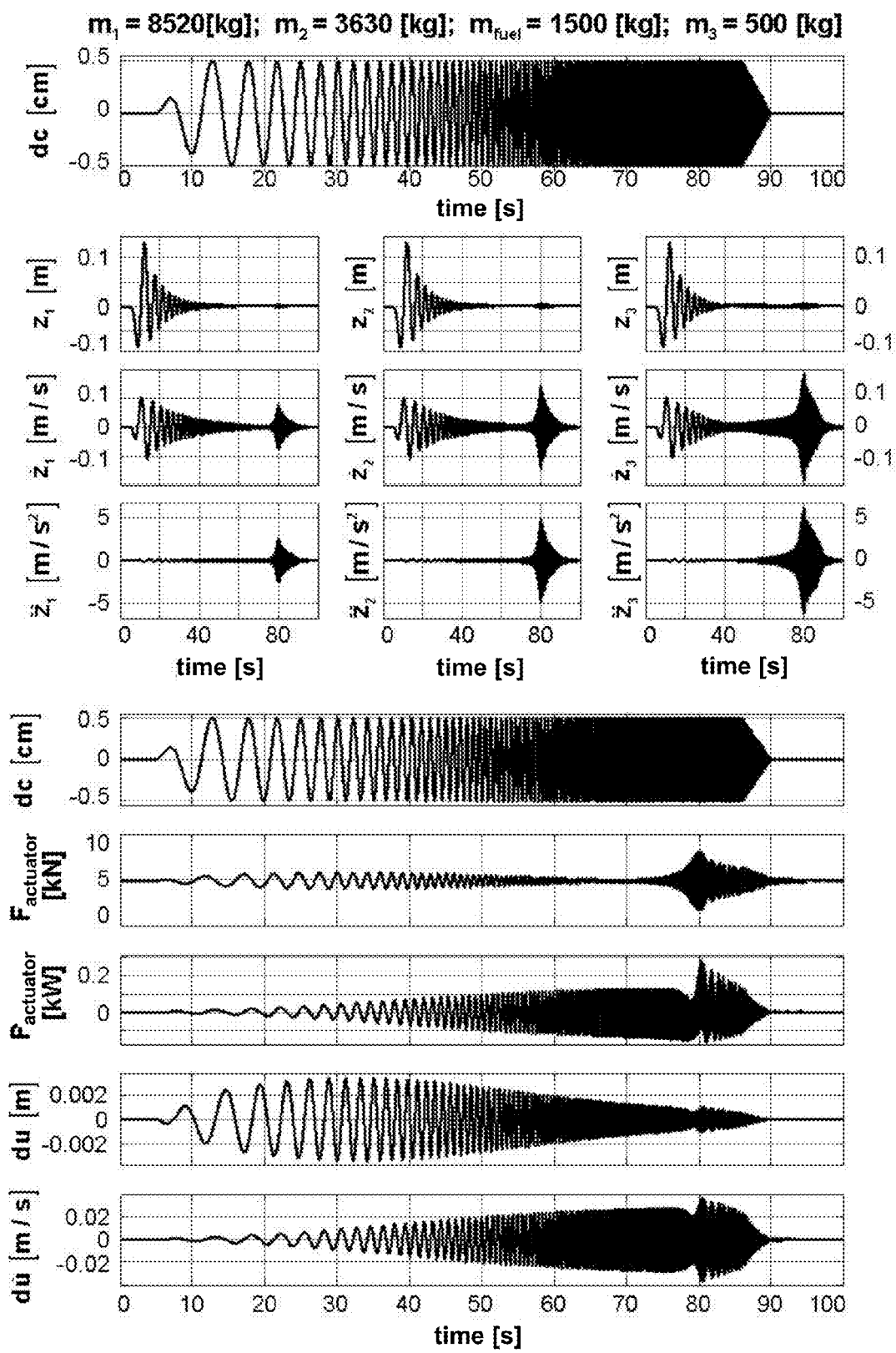
FIG. 18 shows, for the closed equivalent system shown in FIG. 3, plots against time of the positions, velocities and accelerations resulting from a frequency sweep at the control, with a light external payload.

FIG. 18 shows the dynamic response of the system to a frequency-sweep input when carrying a light external load (see FIG. 8). In line with the interrelationships explained above, the system, though stable, is not significantly damped. The effect of a light external load on the helicopter, however, is negligible anyway.

Figure 19:
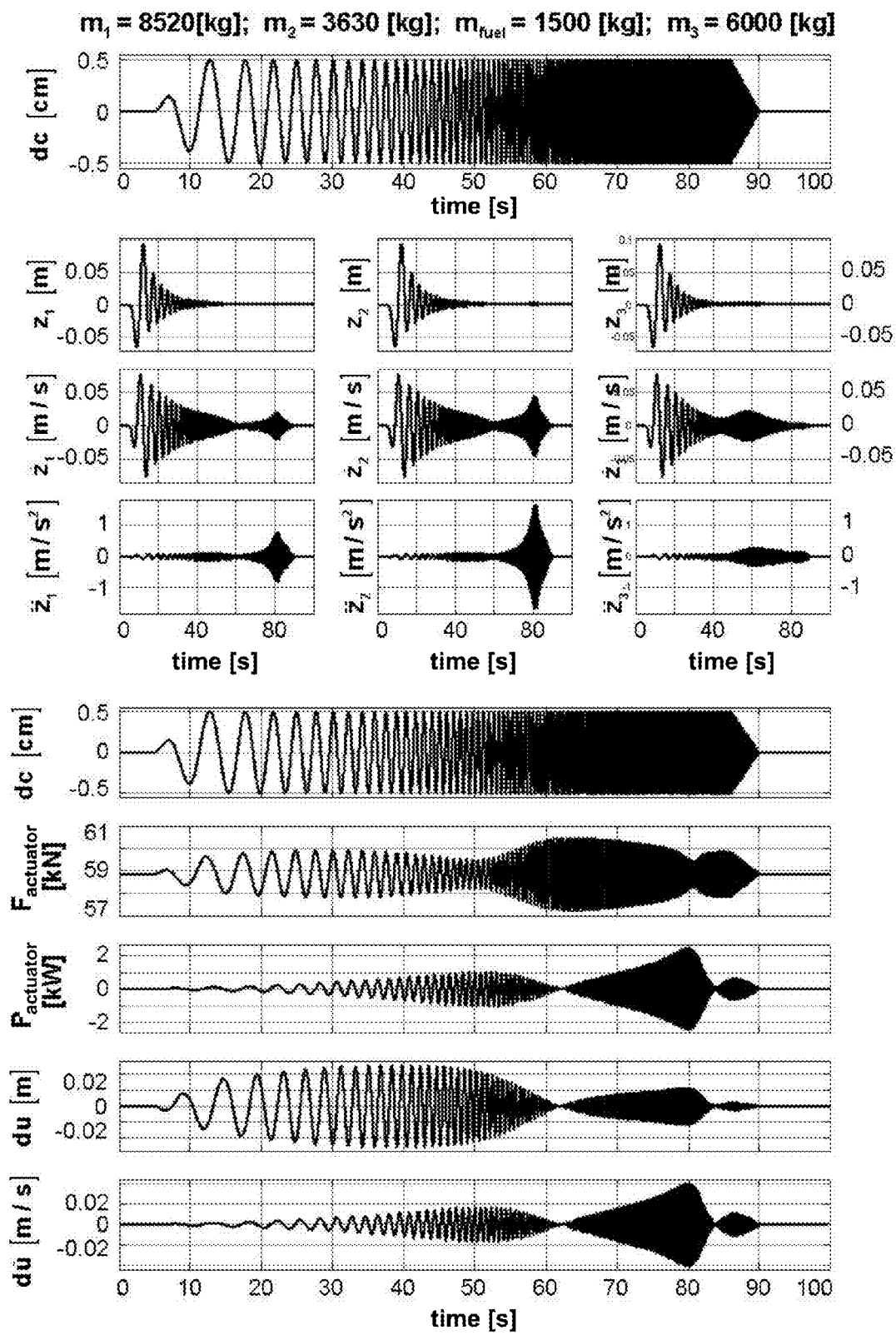
FIG. 19 shows, for the closed equivalent system shown in FIG. 3, plots against time of the positions, velocities and accelerations resulting from a frequency sweep at the control, with a heavy external payload.

FIG. 19 shows the dynamic response of the system to a frequency sweep at the control lever of the helicopter when carrying a heavy external payload (see FIG. 7). In line with the facts explained above, the system is stable; there is a significant increase in damping.

Summary of the Results

Oscillation damping (damping of resonant oscillations) can be achieved by means of an active damping system based on the specifications of an electrical actuator and simplified assumptions made in a model.

The controller was designed on the basis of the command variable which was made up of two spectra of oscillations which were sensed at different points on the airframe of the helicopter. There is no need for any additional measurement of the oscillations in the load system (the cable gear and the external payload).

Robustness exists against variations in the mass, stiffness and the length of the cables.

Structures which are soft in bending such for example as the tail boom are often connected to the top level ($z_1$) of the airframe. It is therefore essential for the oscillations at $z_1$ to be reduced to head off and prevent any structural damage.

When the weight of the external load 3 is low, the same oscillations of the floor 10 of the airframe and of the load-carrying hook 5 occur with and without a damping system; loads of low weigh, however, are not considered critical because they have little effect on the movement of the helicopter and hence of the airframe; on the other hand heavy external loads 3 are reliably damped.

Actuator Requirements

Starting from the maximum periodic excitation at the collective control of ±0.5 cm (±2%) which is laid down by MIL-H-8501A and the analysis of the step responses and of the responses to a frequency sweep at the control in the closed-loop control circuit, it is possible to determine the maximum actuator travel, the maximum stroking frequency and the maximum upper and lower limits of the forces to be applied and of the power consumed by the electric actuator:

$$\delta_{umax} \approx \pm 30 \text{ mm}$$

$$f_{Omax} \approx 10 \text{ Hz}$$

$$f_{Amax} \approx (\text{stat. load} \pm 12)\text{kN}$$

$$P_{Amax} \approx 15 \text{ kW} \tag{8}$$

If different characteristic values are used, e.g. for the cable gear, the requirements for the actuator in the form of the maximum actuator travel, the maximum force and the maximum stroking frequency may vary. The control mode and, related thereto, the results of the analysis of robustness, remain the same. The method remains applicable to different cases.

The consideration of the basics has shown that the approach to the effective boosting of the damping of critical vertical oscillations by means of an actuator connected in series and measurements of the oscillations in the airframe of the helicopter gives a successful outcome.

Remarks

It should be pointed out that when the active oscillation damping system is being implemented, the positioning of the sensors has to be carried out in a way specific to the helicopter.

It also has to be decided whether use should be made of two controllers operating separately from one another which operate in the optimum way for the upper and lower frequency ranges (first and second modes) respectively. The sensors and sensor signals have to be installed and processed specifically for this set-up. The advantage of this type of expanded implementation is the opportunity of increasing the damping of the first mode when the external load is light (see FIG. 13).

The invention can be used in all areas of helicopter flight with external loads. Examples to be mentioned are:
transportation of loads to areas difficult of access
installation of tall or inaccessible items
rescuing of persons
fire-fighting
forestry work.

Many variations and modifications may be made to the preferred embodiments of the invention without departing substantially from the spirit and principles of the invention. All such modifications and variations are intended to be included herein within the scope of the present invention, as defined by the following claims.

LIST OF REFERENCE NUMERALS

1 Helicopter
2 Lifting gear
3 Payload
4 Rotor drive-unit
5 Load attachment point
6 Airframe of helicopter
7 Stiffness and damping of lifting gear
8 Stiffness and damping of airframe
9 Active damping system
10 Floor
11 Mode
12 Mode
13 Linear actuator

We claim:

1. A method of damping vertical oscillations in a helicopter having a rotor drive-unit and an airframe and which carries an external payload suspended via a lifting gear from a load attachment point on the airframe of the helicopter, the method comprising the steps of:
arranging oscillation sensors on the helicopter;
providing an actively operated linear actuator operative between the load attachment point and the lifting gear such that the airframe, the linear actuator, and the lifting gear are connected in series;
sensing, with the oscillation sensors arranged on the helicopter, excitations at least
of a first mode of the vertical oscillations, in which first mode the external load and the rotor drive-unit oscillate together relative to the load attachment point, and
of a second mode of the vertical oscillations, in which the second mode the load attachment point oscillates relative to the external load and the rotor drive-unit, with regard to both phase and amplitude of the excitations; and
applying, between the load attachment point and the lifting gear with the actively operated linear actuator, forces opposed to the vertical oscillations as a function of the phase and of the amplitude of the sensed excitations.

2. The method of claim 1, wherein, in the step of sensing, the resonant frequency of the first mode is between 10 and 30 rad/s.

3. The method of claim 2, wherein, in the step of sensing, the resonant frequency of the second mode is between 30 and 60 rad/s.

4. The method of claim 1, wherein, in the step of arranging, the oscillation sensors are arranged at the rotor drive-unit and at a point selected from the load attachment point and a floor of the airframe of the helicopter.

5. The method of claim 1, wherein, in the step of sensing, the excitations are sensed by one dedicated oscillation sensor arranged on the helicopter per each mode of the vertical oscillations.

6. The method of claim 1, wherein, in the step of providing, the lifting gear is supported at the helicopter by means of a supporting spring arranged in parallel to the linear actuator.

7. A device for damping vertical oscillations in a helicopter having a rotor drive-unit and an airframe and which carries an external payload suspended via a lifting gear from a load attachment point on the airframe of the helicopter, the device comprising:
oscillation sensors arranged on the helicopter and configured to sense excitations at least
of a first mode of the vertical oscillations, in which first mode the external load and the rotor drive-unit oscillate together relative to the load attachment point, and
of a second mode of the vertical oscillations, in which second mode the load attachment point oscillates relative to the external load and the rotor drive-unit,
with regard to both phase and amplitude of the excitations; and
an actively operated linear actuator operative between the load attachment point and the lifting gear, and operated to apply forces opposed to the vertical oscillations as a function of the phase and amplitude of the excitations sensed with the oscillation sensors, the airframe, the linear actuator, and the lifting gear being connected in series.

8. The device of claim 7, wherein the oscillation sensors are arranged at the rotor drive-unit and at a point selected from the load attachment point and a floor of the airframe of the helicopter.

9. The device of claim 7, wherein each oscillation sensor includes an accelerometer.

10. The device of claim 7, wherein a supporting spring supporting the lifting gear at the helicopter is arranged in parallel to the linear actuator.

11. The device of claim 7, wherein the linear actuator includes an electric motor.

12. The device of claim 7, wherein the linear actuator includes a hydraulic drive.

* * * * *